United States Patent
Toyama et al.

(10) Patent No.: US 7,013,472 B2
(45) Date of Patent: Mar. 14, 2006

(54) OPTICAL DISK DEVICE

(75) Inventors: Yasunari Toyama, Osaka (JP); Makoto Kanbayashi, Neyagawa (JP); Kiyoshi Umesaki, Neyagawa (JP); Kiyonari Saruwatari, Kadoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 150 days.

(21) Appl. No.: 10/468,689

(22) PCT Filed: Sep. 5, 2002

(86) PCT No.: PCT/JP02/09065

§ 371 (c)(1),
(2), (4) Date: Aug. 21, 2003

(87) PCT Pub. No.: WO03/028016

PCT Pub. Date: Apr. 3, 2003

(65) Prior Publication Data

US 2004/0071073 A1 Apr. 15, 2004

(30) Foreign Application Priority Data

Sep. 11, 2001 (JP) ............................. 2001-275128
Nov. 27, 2001 (JP) ............................. 2001-360555

(51) Int. Cl.
*G11B 33/14* (2006.01)
(52) U.S. Cl. ..................................... 720/651
(58) Field of Classification Search ................ 720/651, 720/659, 663, 664, 665, 666, 675, 691, 693; 369/247.1
See application file for complete search history.

(56) References Cited

U.S. PATENT DOCUMENTS

| 5,668,791 | A | * | 9/1997 | Yamada et al. ............. 720/693 |
| 5,696,753 | A | * | 12/1997 | Okushita .................... 720/665 |
| 6,137,765 | A | * | 10/2000 | Saito et al. ................. 720/691 |
| 6,449,238 | B1 | * | 9/2002 | Furukawa et al. .......... 720/675 |
| 2002/0021655 | A1 | * | 2/2002 | Shin ........................... 369/247 |
| 2003/0058778 | A1 | * | 3/2003 | Lin ............................. 369/247 |

FOREIGN PATENT DOCUMENTS

| JP | 8-1340 U | 9/1996 |
| JP | 09320214 A | 12/1997 |
| JP | 10208372 A | 8/1998 |

* cited by examiner

*Primary Examiner*—Tianjie Chen
(74) *Attorney, Agent, or Firm*—Akin Gump Strauss Hauer & Feld, LLP

(57) ABSTRACT

In an optical disk apparatus in accordance with the present invention, a tilt chassis (3, 201) to which a main shaft (6) and a sub shaft (7), being parallel with each other and serving to guide the movement direction of an optical pickup (50), are secured is disposed rotatably with respect to a traverse chassis (4) to which a spindle motor (2) is secured, and the tilt chassis (3, 201) is configured so as to be tilt-adjustable with respect to the traverse chassis (4) by tilt adjustment means having two tilt adjustment portions (30, 31), whereby tilt adjustment work for adjusting the movement face of the optical pickup so as to be parallel with the recording face of an optical disk is made easy.

10 Claims, 16 Drawing Sheets

(a)

(b)

(a)

(b)

(a)

(b)

OPTICAL DISK DEVICE

CROSS-REFERENCE TO RELATED APPLICATION

This application is a Section 371 of International Application No. PCT/JP02/09065, filed Sep. 5, 2002, the disclosure of which is incorporated herein by reference.

TECHNICAL FIELD

The present invention relates to an optical disk apparatus for reproducing from back an optical disk on which information has been recorded and for recording information on an optical disk and to a height adjustment device, and more particularly to a tilt adjustment mechanism in an optical disk apparatus for adjusting the tilt of an optical disk mounted on a turntable with respect to the movement face of an optical pickup.

BACKGROUND ART

In a prior-art optical disk apparatus, when information recorded on an optical disk is reproduced by an optical pickup or when information is recorded on an optical disk by the optical disk, the optical axis of a laser beam from the optical pickup is set so as to be perpendicular to the recording face of the optical disk. If the optical axis of the laser beam tilts with respect to the recording face of the optical disk, there is a problem of being unable to accurately carry out recording or reproducing on the optical disk. Conventionally, various tilt adjustment mechanisms for adjusting the tilt of the optical axis are provided for optical disk apparatuses. In particular, high-density optical disks have become to be used, since optical apparatuses have been made higher in speed and larger in capacity in recent years, whereby the accuracy of recording/reproducing has become requested to be strict. Hence, the tilt adjustment mechanism for adjusting the relative angle between the optical axis of the optical pickup and the optical disk has become an important mechanism. Furthermore, since the optical disk apparatus is earnestly requested for reduction in profile, a compact head capable of meeting the need for the reduction in profile has begun to be used; hence the tilt adjustment mechanism is also requested to be capable of meeting the need for further reduction in profile.

In response to such requests for higher speed, larger capacity and lower profile in optical disk apparatuses, various tilt adjustment mechanisms have been developed. As prior-art tilt adjustment mechanisms, devices disclosed in Japanese Unexamined Patent Publication No. Hei 9-320214 and Japanese Unexamined Patent Publication No. Hei 10-208372 are available, for example.

FIG. 14 is a plan view showing a tilt adjustment mechanism in an optical disk apparatus disclosed in Japanese Unexamined Patent Publication No. Hei 9-320214. In FIG. 14, an optical pickup 102 for emitting laser beam to an optical disk 101 is installed between a first guide shaft 103 and a second guide shaft 104 being adjusted in advance so as to be parallel with each other. A first adjustment member 105A and a second adjustment member 105B are provided at both ends of the first guide shaft 103. A third adjustment member 105C and a support member 106 are provided at both ends of the second guide shaft 104. The first to third adjustment members 105A, 105B and 105C are provided with rotation members 108A, 108B and 108C being rotatable with respect to the chassis and also provided with cams 109A, 109B and 109C protruding on the upper faces of these rotation members 108A, 108B and 108C and serving as bearings for the first guide shaft 103 or the second guide shaft 104. These cams 109A, 109B and 109C are configured so that their heights change gradually depending on the rotation angles of the rotation members 108A, 108B and 108C. Hence, by rotating the rotation members 108A, 108B and 108C, the cams 109A, 109B and 109C are rotated, whereby the ends of the first guide shaft 103 and the second guide shaft 104, corresponding thereto respectively, are moved up and down.

In addition, in the vicinities of the rotation members 108A, 108B and 108C, the vicinities of the ends of the first guide shaft 103 and the second guide shaft 104 are supported by U-shaped fittings 107A, 107B and 107C secured to the chassis so as to be movable only upward. Furthermore, the vicinities of the ends of the first guide shaft 103 and the second guide shaft 104 are pressed downward elastically by pressure springs 110A, 110B and 110C. Moreover, the support member 106 rotatably supports one end of the second guide shaft 104.

In the prior-art optical disk apparatus configured as described above and disclosed in Japanese Unexamined Patent Publication No. Hei 9-320214, the rotation members 108A, 108B and 108C and the cams 109A, 109B and 109C, serving as adjustment members, are formed to have the same shapes, respectively. Hence, by rotating the rotation members 108A, 108B and 108C by the same angle, the support points corresponding to the first guide shaft 103 and the second guide shaft 104 are configured so as to be moved by the same height. For this reason, the components of the adjustment members 105A, 105B and 105C are required to be made with high accuracy. The distortion and tilt of the plane including the center axis of the first guide shaft 103 and the center axis of the second guide shaft 104 are adjusted by using the three adjustment members 105A, 105B and 105C.

In other words, in the tilt adjustment of this prior-art optical disk apparatus, it is necessary to adjust the movement face of the optical pickup 102 while the parallelism between the center axis of the first guide shaft 103 and the center axis of the second guide shaft 104 is maintained at all times. Therefore, the parallelism between the center axis of the first guide shaft 103 and the center axis of the second guide shaft 104 is adjusted in advance, and the adjustment members 105A and 105B are moved synchronously by the same amount, and then the adjustment members 105B and 105C are moved synchronously by the same amount. By repeating these adjustment operations, the optical pickup 102 is disposed so as to take an optimal movement path. Hence, in this prior-art optical disk apparatus, synchronous adjustment processes at a plurality of points are required a plurality of times so that the recording face of the optical disk 101 becomes parallel with the movement face of the optical pickup 102. In this synchronous adjustment process, two of the plurality of points are required to be rotated and adjusted synchronously; hence, manual adjustment is difficult, whereby it is necessary to use jigs or adjustment devices specially intended for the purpose.

In the prior-art optical disk apparatus configured as described above, the components of the adjustment members of the optical disk apparatus disclosed in Japanese Unexamined Patent Publication No. Hei 9-320214 are required to be made with high accuracy, and special devices are required to be used for the tilt adjustment in the production process thereof. This results in causing a problem of increasing production cost. Since this prior-art optical disk apparatus is configured so that the movement face of the optical pickup is adjusted by using the adjustment members disposed at the three points, the adjustment process is required a plurality of times, whereby complicated adjustment work is necessary. Furthermore, air current produced by the rotation of the optical disk flows through the space in which the optical pickup is disposed, fine-grain dust adheres to the optical components thereof, and the amount of light decreases during a long period of use, thereby causing reduction in performance or falling into impossible reproduction in the worst case.

FIG. 15 is a side sectional view showing the vicinity of the spindle motor installation portion of the prior-art optical disk apparatus disclosed in Japanese Unexamined Patent Publication No. Hei 10-208372. In FIG. 15, a spindle motor 112, the rotation shaft of which is secured to a turntable 111, is installed on the upper face of a support plate 113. A first locking screw 115 passes through a first spring 115A disposed between a locking board 114 for supporting the entire apparatus and the support plate 113 and is threadedly engaged with the threaded portion of the support plate 113. Hence, the support plate 113 is biased by the first spring 115A in the direction of being separated from the locking board 114. In addition, just like the first locking screw 115, a second locking screw 116 passes through a second spring 116A disposed between the locking board 114 and the support plate 113 and is threadedly engaged with the threaded portion of the support plate 113. Hence, the support plate 113 is biased by the second spring 116A in the direction of being separated from the locking board 114. The first locking screw 115 and the second locking screw 116 are provided at positions away from the same distance from the center axis of an optical disk mounted on the turntable 111.

A hemispherical convex portion 117 protruding downward is formed on the lower face of the support plate 113. The hemispherical face of this convex portion 117 is formed on an arc, the center of which is located at a point 111b wherein a disk mounting face 111a is orthogonal to the center of the rotation shaft of the spindle motor 112. On the upper face of the locking board 114, three small hemispherical protrusions 118, protruding upward, are formed. These protrusions 118 are disposed so as to support the hemispherical convex portion 117 at three points.

Next, tilt adjustment work in the apparatus disclosed in Japanese Unexamined Patent Publication No. Hei 10-208372 configured as described above will be described.

First, when the first locking screw 115 threadedly engaged with the support plate 113 is rotated, the support plate 113 is turned and displaced along the shape of the hemispherical convex portion 117. As a result, the spindle motor 112 and the turntable 111 can be tilted in the radial direction of the tracks of the optical disk.

Next, when the second locking screw 116 threadedly engaged with the support plate 113 is rotated, the support plate 113 is turned and displaced along the shape of the hemispherical convex portion 117. As a result, the spindle motor 112 and the turntable 111 can be tilted in the tangential direction of the tracks of the optical disk.

By rotating the first locking screw 115 and the second locking screw 116 as described above, tilt adjustment can be carried out so that the disk mounting face 111a becomes orthogonal to the optical axis of the optical pickup.

In the optical disk apparatus configured as described above and disclosed in Japanese Unexamined Patent Publication No. Hei 10-208372, the spindle motor and the turntable are directly turned with respect to the movement face of the optical pickup during the tilt adjustment operation.

Hence, the configuration of this optical disk apparatus is required to secure space for vertical adjustment of the optical disk mounted on the turntable, thereby hindering profile reduction of the apparatus. The optical disk apparatus disclosed in Japanese Unexamined Patent Publication No. Hei 10-208372 is configured so that the spindle motor for rotating the optical disk is supported by the springs 115A and 116A serving as the tilt adjustment members. Because of this configuration, in the case when an unbalanced optical disk is mounted and rotated, the spindle motor portion may resonate, thereby causing a danger of producing vibration, such as swinging, resulting in adversely affecting devices.

Next, specific examples of prior-art tilt adjustment members are taken and their problems will be described.

In an optical disk apparatus, information is recorded by applying laser beam to an optical disk and by changing the state of the optical disk. In addition, recorded information is reproduced on the basis of the difference in the reflection of the laser beam due to the difference in the state of the recording face of the optical disk. Hence, the laser beam emitted from the optical pickup is required to be applied accurately so as to be orthogonal to the recording face of the optical disk without changing the shape of the spot light thereof. Therefore, in the production process of the optical disk apparatus, it is necessary to accurately adjust the application angle of the laser beam to the optical disk while the laser beam emitted from the optical pickup is applied to the recording face of the optical disk. In this adjustment process, the relationship in height between the optical disk mounting face of the turntable rotating with the optical disk mounted thereon (or a chassis rotatably supporting this turntable) and the movement face of the optical pickup by the movement mechanism of the optical pickup (or a sub chassis supporting this movement mechanism) is adjusted. Furthermore, the parallelism between the reference planes of the chassis and the sub chassis is adjusted so as to be within predetermined accuracy in the production process of the optical disk apparatus.

Apparatuses wherein such a relationship in height is required to be adjusted accurately are not limited to optical disk apparatuses. For example, in magnetic recording/reproducing apparatuses, such as video tape recorders (VTRs), the positional relationship between a rotation head drum on which tape serving as a recording medium is wound askew so as to carry out helical recording thereon and the traveling tape, the positional relationships among a plurality of magnetic heads provided inside the rotation head drum relative to the tape, etc. are also required to be adjusted similarly.

The chassis supporting the turntable and the sub chassis supporting the movement mechanism, described above, are generally configured so as to be supported at three points. In the case when the parallelism between the reference plane of the chassis and the reference plane of the sub chassis is adjusted, one of the three support points is used as an engaged movable fulcrum, and the heights (distances) at the other two points are made adjustable, and then the above-mentioned tilt adjustment should be carried out.

FIG. 16 is a sectional view showing the configuration of the adjustment point of a prior-art tilt adjustment mechanism configured as described above. In FIG. 16, the portion (a) shows a state before an adjustment screw 311 is installed in a sub chassis 303 and a chassis 304, and the portion (b) shows a state wherein the adjustment screw 311 has been installed in the sub chassis 303 and the chassis 304.

In FIG. 16, a threaded hole 303a having a female thread 303n into which the adjustment screw 311 is tightened is formed in the sub chassis 303. The chassis 304 is disposed so that its height (separation distance) is adjusted with respect to the sub chassis 303, and the adjustment screw 311 inserted into a through hole 304 formed in the chassis 304 is threadedly engaged with the threaded hole 303a formed in the sub chassis 303. An adjustment spring 314 is disposed in the vicinity of the threaded hole 303a and held between the sub chassis 303 and the chassis 304. Hence, the chassis 304 is biased in the direction of being separated from the sub chassis 303 and locked by the head portion 311a of the adjustment screw 311, whereby the distance (the separation distance) between the chassis 304 and the sub chassis 303 is determined. In this example, the adjustment spring 314 is the so-called helical spring, and the adjustment screw 311 is disposed so as to pass through the helical spring. Hence, a boss portion 303b, in which the threaded hole 303a is formed, is formed to have a diameter slightly smaller than the diameter of the spring so as to be insertable into the helical spring. Because of this configuration, the female thread 303n can be formed so as to be long in the sub chassis 303, whereby the portion tightened by the screw is made long and the assembly work for the adjustment spring 314 is made easy.

The operation of the prior-art tilt adjustment mechanism configured as described above will be described below.

First, the adjustment spring 314 is inserted over the boss portion 303b of the sub chassis 303. Next, the chassis 304 is disposed at a predetermined position, and the adjustment screw 311 is passed through a through hole 304a in the chassis 304 and temporarily screw-locked into the threaded hole 304a in the chassis 304 (turning operation in the arrow direction indicated by letter F in the portion (a) of FIG. 16). Next, the adjustment screw 311 is turned (turning in the arrow directions indicated by letter R in the portion (b) of FIG. 16) so that the adjustment screw 311 is threadedly engaged with the female thread 303n in the threaded hole 303a thereby to adjust the distance between the sub chassis 303 and the chassis 304. By this thread engagement operation, the position of the head portion 311a of the adjustment screw 311 is moved with respect to the sub chassis 303, whereby the position of the chassis 304 (the separation distance: the distance indicated by letter M in the portion (b) of FIG. 16) biased by the adjustment spring 314 so as to be separated is determined.

After the tilt adjustment is completed as described above, the adjustment screw 311 is locked by a screw locking treatment by using locking paint, for example, so as not to rotate, whereby the rotation of the adjustment screw 311 is prevented and the height of the head portion 311a remains unchanged.

However, in the above-mentioned prior-art tilt adjustment mechanism, the female thread 303n is required to be formed in advance at the predetermined position of the boss portion 303b of the sub chassis 303, thereby having a problem of increasing machining cost. In addition, if the backlash between the thread portion 311n of the adjustment screw 311 and the female thread 303n of the boss portion 303b is large, there is a problem of lowering the accuracy of the adjustment. On the other hand, if the clearance is made smaller so that the backlash between the threaded portion 311n of the adjustment screw 311 and the female thread 303n of the boss portion 303b is made smaller, the rotation of the adjustment screw 311 becomes heavy, thereby causing a problem of making the adjustment work difficult. If an attempt is made to suitably set the clearance, variations in the machining accuracy of the female thread 303n of the sub chassis 303 and the quality of the adjustment screw 311 are required to be eliminated.

As a tilt mechanism for solving the problems in the above-mentioned prior-art tilt adjustment mechanism shown in FIG. 16, a mechanism shown in FIG. 17 is available. FIG. 17 is a sectional view showing a tilt adjustment point in another configuration of the prior-art tilt adjustment mechanism. In FIG. 17, the portion (a) shows a state before an adjustment screw 411 is installed in a sub chassis 403 and a chassis 404, and the portion (b) shows a state wherein the adjustment screw 411 has been installed in the sub chassis 403 and the chassis 404.

As shown in FIG. 17, no threaded portion is formed in a through hole 403a in the sub chassis 403, and a tip portion 411t, that is, the tip of the threaded portion 411n of the adjustment screw 411, is formed to have a tapered shape. The adjustment screw 411 shown in FIG. 17 is the so-called tapping screw having a male thread. This adjustment screw 411 is inserted into a through hole 404a in the chassis 404 and temporarily screw-locked to the through hole 403a in the chassis 403 (turning operation in the arrow direction indicated by letter F in the portion (a) of FIG. 17). Next, the adjustment screw 411 is turned (turning in the arrow directions indicated by letter R in the portion (b) of FIG. 17) to adjust the distance between the sub chassis 403 and the chassis 404, while the adjustment screw 411 is engaged with the through hole 403a. By this engagement operation, the position of the head portion 411a of the adjustment screw 411 is moved with respect to the sub chassis 403, whereby the position of the chassis 404 (the separation distance: the distance indicated by letter M in the portion (b) of FIG. 17) biased by the adjustment spring 414 so as to be separated is determined.

By screwing the adjustment screw 411 into the through hole 403a in the sub chassis 403 as described above, the tip portion 411t of the adjustment screw 411 forms a female thread inside the through hole 403a.

The tilt adjustment mechanism shown in FIG. 17 is characterized in that it is not necessary to form a female thread in the boss portion 403b thereof in advance. However, in the tilt adjustment, since the threaded portion 411n of the adjustment screw 411 reciprocates along the female thread portion, formed by the tapping operation, of the through hole 403a in the sub chassis 403, there is a problem of making the adjustment not easy. In other words, in the tilt adjustment, when the tip portion 411t of the adjustment screw 411 is inserted into the through hole 403a, rotating the adjustment screw 411 becomes very tight, thereby causing a problem of being incapable of making smooth fine adjustment easy.

In order to solve various problems in the above-mentioned prior art, the present invention is intended to facilitate tilt adjustment work for adjusting the movement face of the optical pickup so as to be parallel with the recording face of the optical disk and to provide an optical disk apparatus being high in reliability and capable of meeting the needs for higher speed, larger capacity and lower profile. Furthermore, the present invention is intended to make the above-mentioned adjustment work by using the tilt mechanism easy and to provide a height adjustment device capable of easily fine-adjusting the distance between the chassis and the sub chassis.

DISCLOSURE OF THE INVENTION

An optical disk apparatus in accordance with the present invention comprises:

a turntable on which an optical disk is mounted, a spindle motor for driving the above-mentioned turntable, a traverse chassis to which the above-mentioned spindle motor is secured, an optical pickup, moving in the radial direction of the above-mentioned optical disk, for reading information written on the above-mentioned optical disk or writing information on the above-mentioned optical disk, a tilt chassis provided with a main shaft and a sub shaft, being parallel with each other, for guiding the movement direction of the above-mentioned optical pickup, and tilt adjustment means for tilt-adjusting the above-mentioned tilt chassis with respect to the above-mentioned traverse chassis.

In the optical disk apparatus configured as described above, the movement face of the optical pickup can be adjusted easily so as to be parallel] with the receiving face of the optical disk.

An optical disk apparatus in accordance with the present invention is characterized in that the above-mentioned optical pickup comprises a lens projection portion for applying light to the optical disk and a main body for supporting the above-mentioned lens projection portion so as to be movable in the radial direction of the optical disk, and that the main face of the above-mentioned tilt chassis is disposed on the optical disk side of the above-mentioned main body. In the optical disk apparatus configured as described above, the movement face of the optical pickup can be adjusted easily so as to be parallel with the recording face of the optical disk, and the need for profile reduction of the apparatus can be satisfied.

An optical disk apparatus in accordance with the present invention is characterized in that the above-mentioned tilt chassis is engaged with the above-mentioned traverse chassis so as to be contactingly movable at one adjustment support portion, that the above-mentioned tilt adjustment means comprises two tilt adjustment portions, and that the tilt adjustment portions are disposed on both sides of the movement path of the above-mentioned lens projection portion on the above-mentioned tilt chassis. In the optical disk apparatus configured as described above, the movement face of the optical pickup can be adjusted easily so as to be parallel with the recording face of the optical disk, and the need for profile reduction of the apparatus can be satisfied.

An optical disk apparatus in accordance with the present invention is characterized in that the above-mentioned tilt adjustment means has an elastic member so as to absorb vibration between the above-mentioned tilt chassis and the above-mentioned traverse chassis. In the optical disk apparatus configured as described above, vibration from the spindle motor and the like is absorbed, whereby reading and written can be carried out securely.

An optical disk apparatus in accordance with the present invention further comprises:

first traverse driving means, provided on the above-mentioned traverse chassis, for generating a driving force, and second traverse driving means, provided on the above-mentioned tilt chassis, for transmitting the driving force for moving the above-mentioned optical pickup from the above-mentioned first traverse driving means to the above-mentioned main shaft. In the optical disk apparatus configured as described above, the driving force from the first traverse driving means is transmitted securely to the main shaft via the second traverse driving means.

An optical disk apparatus in accordance with the present invention further comprises:

first traverse driving means, provided on the above-mentioned traverse chassis, for generating a driving force, and second traverse driving means, provided on the above-mentioned tilt chassis, for transmitting the driving force for moving the above-mentioned optical pickup from the above-mentioned first traverse driving means to the above-mentioned main shaft, wherein a connection portion for transmitting the driving force from the above-mentioned first traverse driving means to the above-mentioned second traverse driving means is provided in the vicinity of the adjustment support portion between the above-mentioned tilt chassis and the above-mentioned traverse chassis. In the optical disk apparatus configured as described above, the connection portion between the first traverse driving means and the second traverse driving means is maintained in a state of being capable of securely transmitting the driving force even after tilt adjustment.

An optical disk apparatus in accordance with the present invention is characterized in that the above-mentioned sub shaft is integrally molded with the above-mentioned tilt chassis. In the optical disk apparatus configured as described above, the movement face of the optical pickup can be adjusted easily so as to be parallel with the recording face of the optical disk.

An optical disk apparatus in accordance with the present invention is characterized in that the above-mentioned tilt adjustment means comprises two tilt adjustment portions, that the above-mentioned tilt chassis is engaged with the above-mentioned traverse chassis so as to be contactingly movable at one adjustment support portion, that the above-mentioned adjustment support portion is disposed in the vicinity of the end of the above-mentioned main shaft on the inner circumferential side of the optical disk, that one of the tilt adjustment portions is disposed in the vicinity of the end of the above-mentioned main shaft on the outer circumferential side of the optical disk, and that the other tilt adjustment portion is disposed on the side of the above-mentioned sub shaft. In the optical disk apparatus configured as described above, the movement face of the optical pickup can be adjusted easily so as to be parallel with the recording face of the optical disk.

An optical disk apparatus in accordance with the present invention is characterized in that the above-mentioned main shaft, the above-mentioned sub shaft and the above-mentioned optical pickup are configured so as to be capable of being installed on the above-mentioned tilt chassis in advance. In the optical disk apparatus configured as described above, the movement face of the optical pickup can be adjusted easily so as to be parallel with the recording face of the optical disk, and assembly in the production process therefor is made easy.

An optical disk apparatus in accordance with the present invention further comprises a tilt cover disposed so as to cover the above-mentioned optical pickup, the above-mentioned main shaft and the above-mentioned sub shaft provided on the above-mentioned tilt chassis. In the optical disk apparatus configured as described above, dust generating owing to air current produced by the rotation of the optical disk and adhering to the optical pickup can be reduced significantly.

In addition, an optical disk apparatus in accordance with the present invention is characterized in that the above-mentioned optical pickup comprises a lens projection portion for applying light to the optical disk and a main body for supporting the above-mentioned lens projection portion so as to be movable in the radial direction of the optical disk, wherein the above-mentioned main body is disposed on the optical disk side of the main face of the above-mentioned tilt chassis. In the optical disk apparatus configured as described above, the need for profile reduction of the apparatus can be satisfied.

Furthermore, the above-mentioned optical pickup, the above-mentioned main shaft and the above-mentioned sub shaft are disposed in internal space formed by the above-mentioned tilt chassis and the above-mentioned tilt cover, wherein the above-mentioned tilt chassis and the above-mentioned tilt cover are integrally tilt-adjustable with respect to the above-mentioned traverse chassis by the above-mentioned tilt adjustment means. In the optical disk apparatus configured as described above, dust generating owing to air current produced by the rotation of the optical disk and adhering to the optical pickup can be reduced significantly, and the replacement of the optical pickup is made easy.

Still further, an optical disk apparatus in accordance with the present invention is characterized in that the above-mentioned tilt chassis can be attached to and detached from the above-mentioned tilt adjustment means without changing the tilt adjustment state between the above-mentioned tilt chassis and the above-mentioned traverse chassis. In the optical disk apparatus configured as described above, the tilt chassis can be detached from the tilt adjustment means and separated from the traverse chassis easily, or reversely, the tilt chassis can be attached to the tilt adjustment means and installed on the traverse chassis easily while the adjustment state of the tilt adjustment means configured on the traverse chassis remains unchanged. Hence, even when the tilt chassis is attached to or detached from the traverse chassis at the time of the maintenance, replacement or the like of the optical pickup, the state of the tilt adjustment remains unchanged, whereby it is not necessary to reattempt tilt adjustment on each occasion.

A height adjustment device in accordance with the present invention comprises:

a first chassis having an adjustment hole, an adjustment screw that stands when threadedly engaged with the above-mentioned adjustment hole in the above-mentioned first chassis, a second chassis locked by the above-mentioned adjustment screw so as to have a preset separation distance from the above-mentioned first chassis, and biasing means for biasing the above-mentioned first chassis and the above-mentioned second chassis in the direction of attaining separation therebetween, wherein the above-mentioned adjustment screw has a tip portion for forming a female thread in the above-mentioned adjustment hole when rotated and inserted into the above-mentioned adjustment hole, a threaded portion having a male thread threadedly engaged with the female thread formed by the above-mentioned tip portion, and a head portion for locking the second chassis against the direction of biasing by the above-mentioned biasing means, in a nearly linear state, and the distance between the end of the head portion of the above-mentioned adjustment screw on the male thread side and the end of the-tip portion on the male thread side is made larger than the sum of the length of the inside diameter portion of the above-mentioned adjustment hole in which the female thread is formed, the maximum value of the distance between the above-mentioned first chassis and the above-mentioned second chassis and the thickness of the above-mentioned second chassis.

Still further, a height adjustment device in accordance with the present invention is configured so that the adjustment hole in the above-mentioned first chassis has a small diameter portion in which the female thread is formed and a large diameter portion having a diameter larger than the outside diameter of the tip portion of the above-mentioned adjustment screw and so that the above-mentioned adjustment screw is inserted from the side of the above-mentioned small diameter portion to the side of the above-mentioned large diameter portion.

Still further, a height adjustment device in accordance with the present invention is configured so that the threaded portion of the above-mentioned adjustment screw has the same pitch as that of the tip portion and is provided with thread ridges, the diameter of which is smaller than that of the above-mentioned tip portion While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the drawings are schematic representations for purposes of illustration and do not necessarily depict the actual relative sizes or locations of the elements shown.

BEST MODE FOR CARRYING OUT THE INVENTION

Preferred embodiments of an optical disk apparatus in accordance with the present invention will be described below referring to the accompanying drawings.

<<Embodiment 1>>

Figure 1:
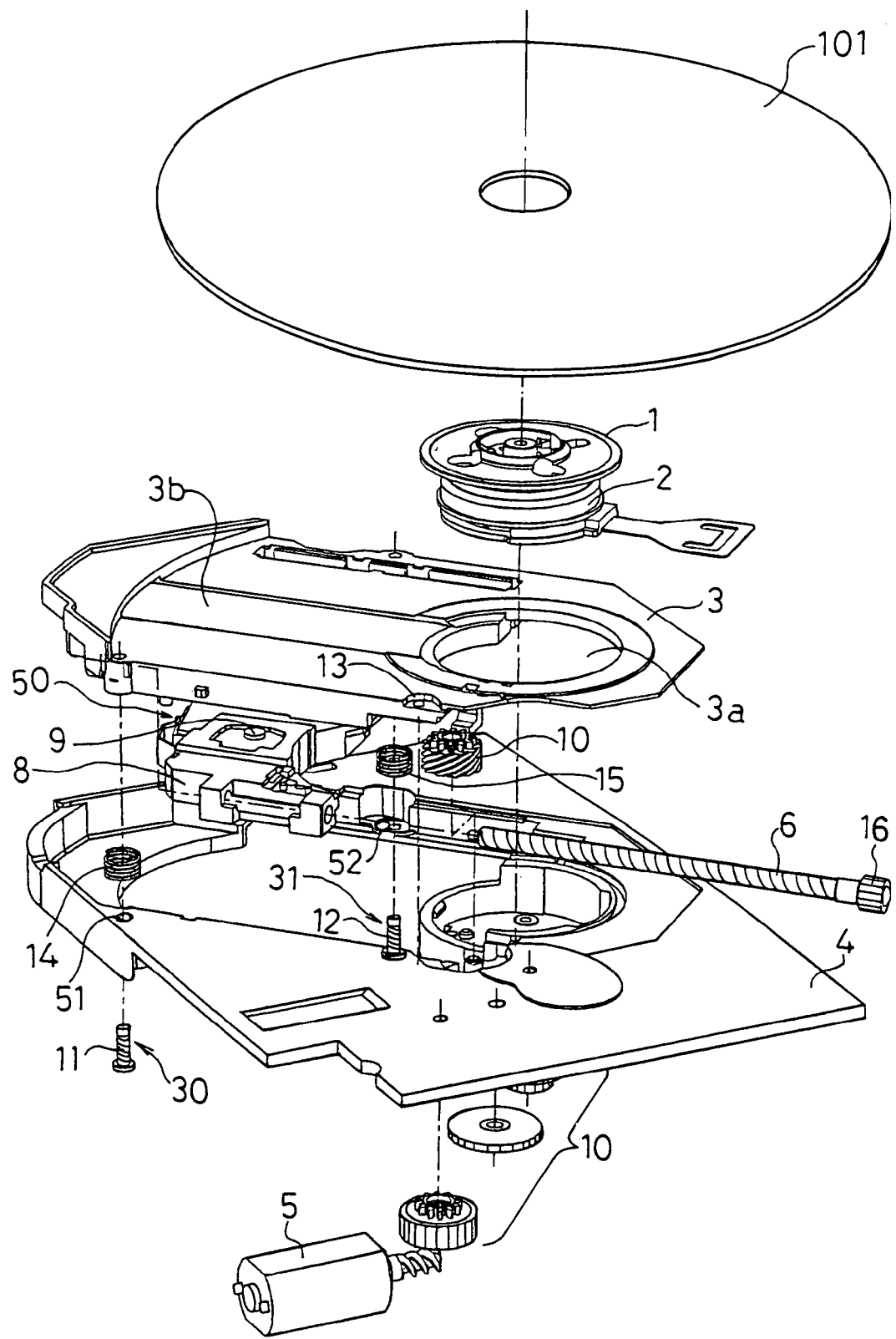
FIG. 1 is a perspective view showing the vicinity of a spindle motor in an optical disk apparatus in accordance with Embodiment 1 of the present invention, taken from above.
Figure 2:
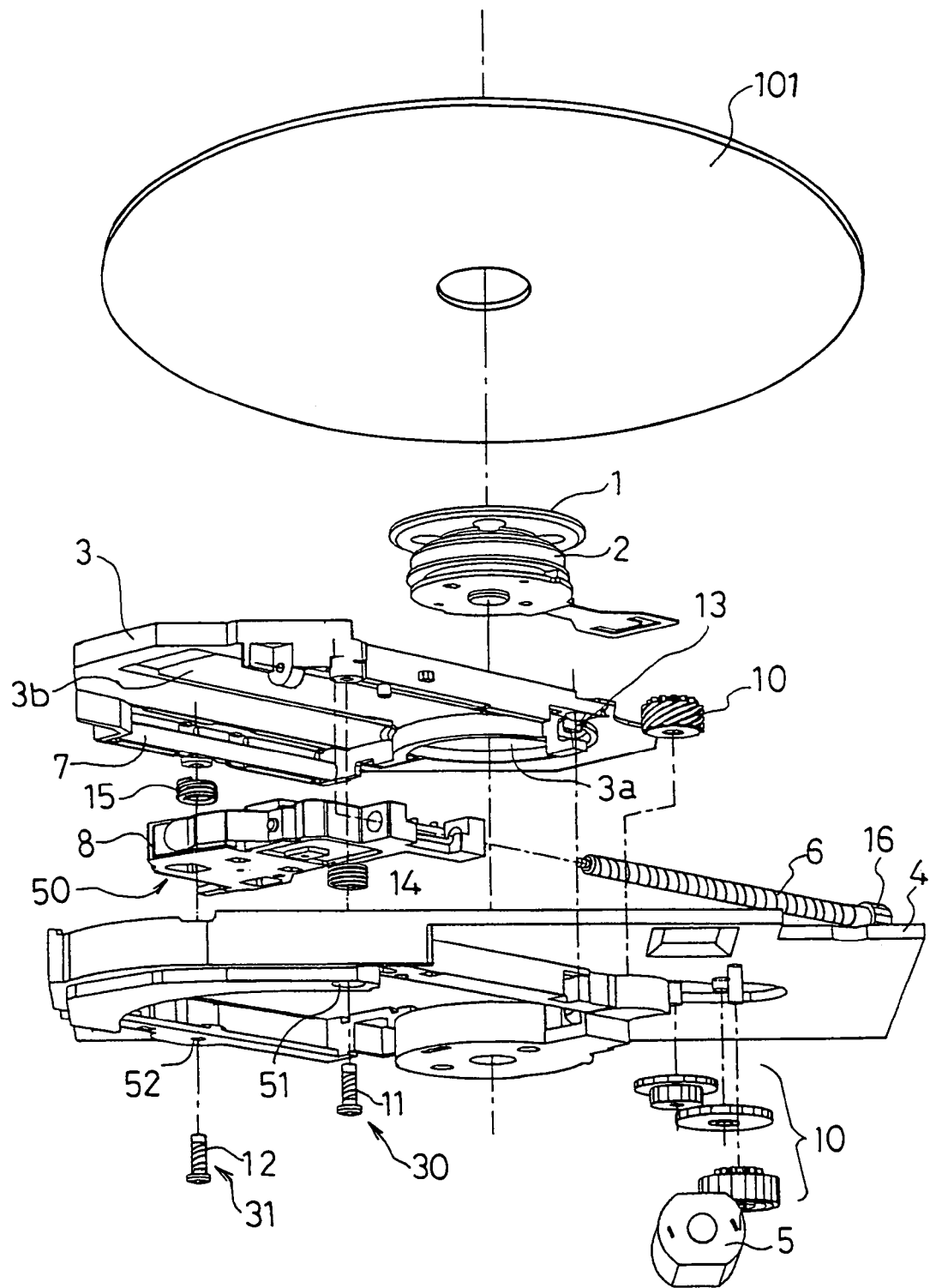
FIG. 2 is a perspective view showing the vicinity of the spindle motor in the optical disk apparatus in accordance with Embodiment 1, taken from below.
Figure 3:
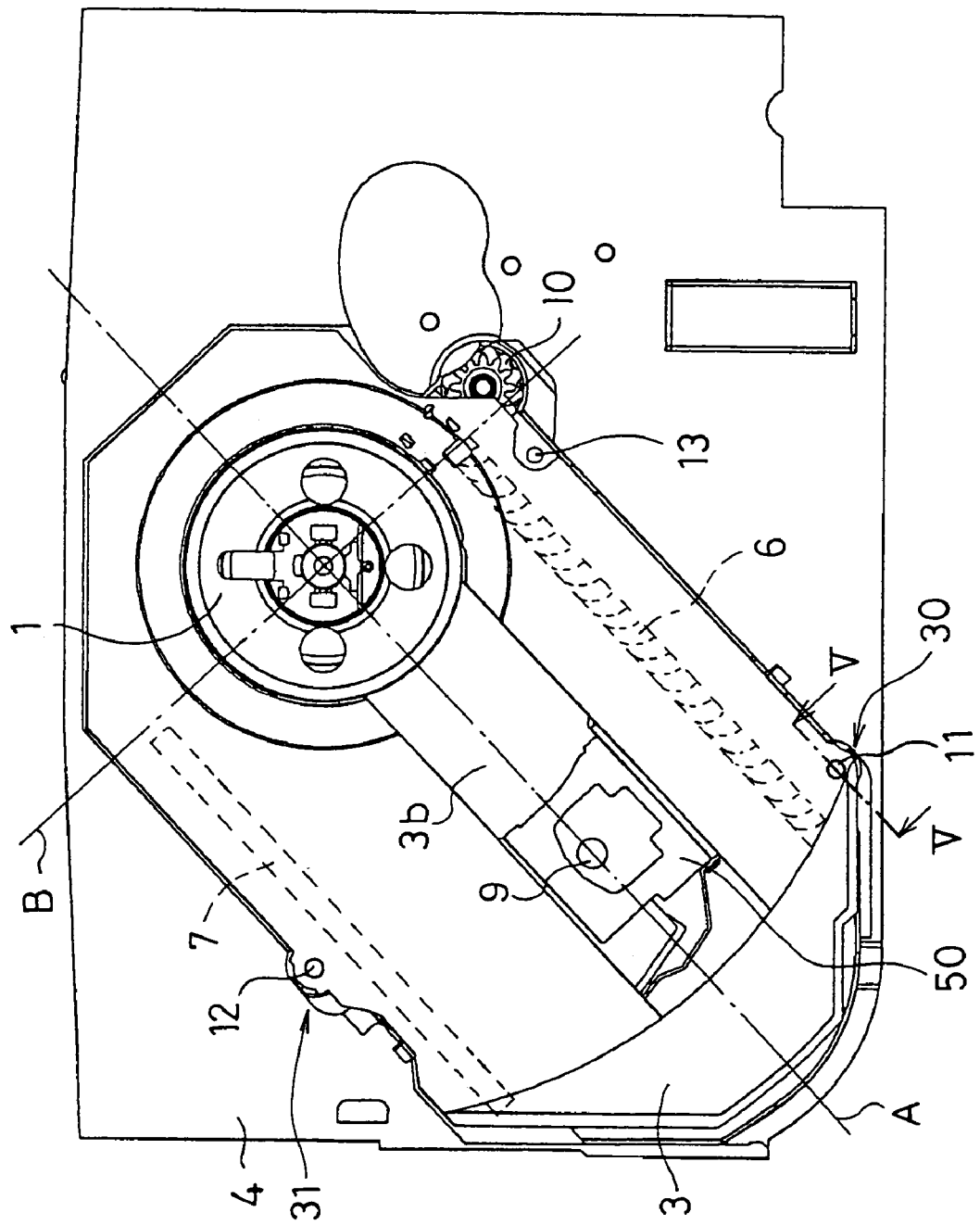
FIG. 3 is a plan view showing major components in the vicinity of the spindle motor in accordance with Embodiment 1.
Figure 4:
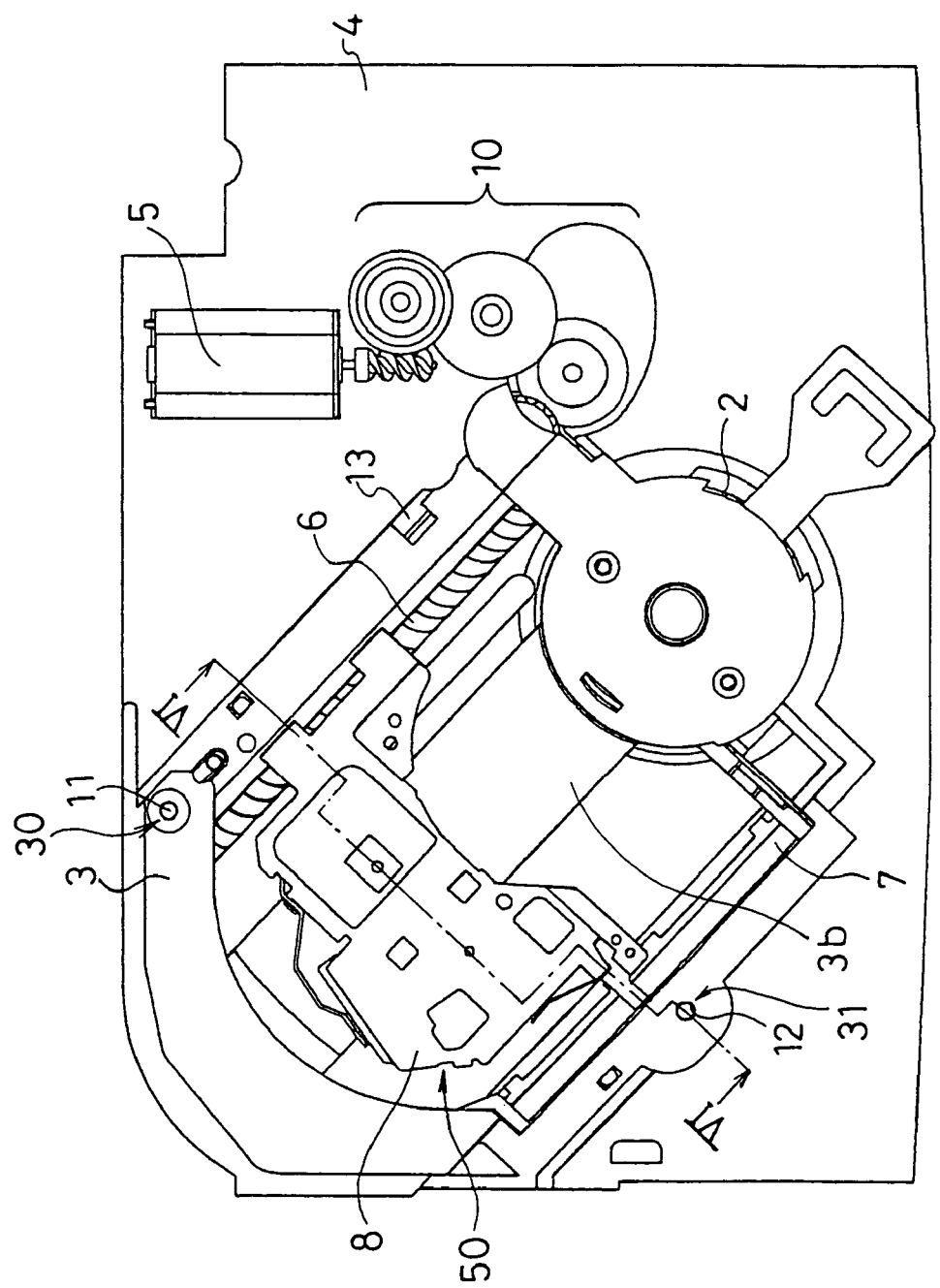
FIG. 4 is a rear view showing the major components in the vicinity of the spindle motor shown in FIG. 3.

FIG. 1 is a perspective view showing components in the vicinity of a spindle motor in an optical disk apparatus in accordance with Embodiment 1 of the present invention, taken from above (on the side of an optical disk mounted on a turntable). FIG. 2 is a perspective view showing the components in the vicinity of the spindle motor in the optical disk apparatus in accordance with Embodiment 1, taken from below. FIG. 3 is a plan view showing the upper faces of major components in the vicinity of the spindle motor in accordance with Embodiment 1. FIG. 4 is a rear view showing the lower faces of the major components in the vicinity of the spindle motor shown in FIG. 3.

In FIG. 1, a turntable 1 on which an optical disk 101 is mounted is directly connected to the rotation shaft of a spindle motor 2. The spindle motor 2 is secured to a traverse chassis 4. A traverse motor 5 and a first traverse drive mechanism 10 for transmitting the driving force of the motor are provided on the rear face of this traverse chassis 4.

The traverse chassis 4 is engaged with a tilt chassis 3 so as to be contactingly movable at an adjustment support portion 13 described later and locked at two tilt adjustment portions 30 and 31. The tilt chassis 3 is configured so that tilt adjustment can be carried out with respect to the traverse chassis 4 by the two tilt adjustment portions 30 and 31 serving as tilt adjustment means. The tilt adjustment portions 30 and 31 comprise two sets of adjustment screws 11 and 12 and springs 14 and 15. The adjustment screws 11 and 12 pass through holes 51 and 52 formed in the traverse chassis 4 and the springs 14 and 15 and are threadedly engaged with the tilt chassis 3.

An optical pickup 50 that moves in the radial direction of the optical disk 101 mounted on the turntable 1 has an optical pickup body 8 and a lens projection portion 9 provided on the upper face (on the side of the optical disk) of the optical pickup body 8. The main face of the tilt chassis 3 is disposed between the upper face of the optical pickup body 8 and the lower face of the optical disk.

As shown in FIG. 2, the tilt chassis 3 is provided with a main shaft 6 serving as a drive guide for the optical pickup body 8 in the radial direction of the optical disk 101 and a sub shaft 7 serving as a guide shaft. A thread is formed on the main shaft 6, and the optical pickup body 8 engaged with this main shaft 6 is configured so as to be moved linearly by the rotation of the main shaft 6. The sub shaft 7 is formed so as to be integrally molded with the tilt chassis 3. In addition, a second traverse drive mechanism 16 engaged with the first traverse drive mechanism 10 provided on the traverse chassis 4 is provided on the tilt chassis 3. The driving force of the traverse motor 5 is transmitted to the main shaft 6 via the first traverse drive mechanism 10 provided on the rear face of the traverse chassis 4 and the second traverse drive mechanism 16 provided on the tilt chassis 3. The connection between the first traverse drive mechanism 10 and the second traverse drive mechanism 16 is disposed in the vicinity of the adjustment support portion 13 for supporting the tilt chassis 3 on the traverse chassis 4. This adjustment support portion 13 supports the tilt chassis 3 so as to be movably engaged with the traverse chassis 4.

As shown in FIG. 1 and FIG. 2, two opening portions 3a and 3b are formed in the tilt chassis 3. The first opening portion 3a is an opening through which the spindle motor 2 is inserted and disposed, and the turntable 1 is disposed at the upper portion thereof. The second opening portion 3b is formed along the movement path of the lens projection portion 9 so that the lens projection portion 9 of the optical pickup 50 can see the recording face of the optical disk 101 mounted on the turntable 1.

FIG. 3 is a plan view showing a state wherein the spindle motor 2 and the tilt chassis 3 are installed on the traverse chassis 4 in accordance with Embodiment 1, and FIG. 4 is a rear view showing the traverse chassis 4 of FIG. 3.

As shown in FIG. 3 and FIG. 4, the first adjustment screw 11 and the second adjustment screw 12 of the tilt adjustment means in accordance with Embodiment 1 are provided in the vicinity of the fringe portion of the tilt chassis 3 and disposed on both sides of a straight line A including the movement path of the lens projection portion 9 of the optical pickup 50. In addition, the adjustment support portion 13 is formed in the vicinity of the fringe portion of the tilt chassis 3 near the center shaft of the turntable 1. This adjustment support portion 13 and the first adjustment screw 11 are provided in the vicinities of both ends of the main shaft 6 provided on the rear face of the tilt chassis 3, the adjustment support portion 13 is in the vicinity of the end of the main shaft 6 on the inner circumferential side of the optical disk, and the first adjustment screw 11 is in the vicinity of the end of the main shaft 6 on the outer circumferential side of the optical disk. Hence, the adjustment support portion 13 and the first adjustment screw 11 are disposed on the same side of the straight line A including the movement path of the lens projection portion 9 and serving as a boundary. Furthermore, as shown in FIG. 3 and FIG. 4, the second adjustment screw 12 is disposed in the nearly intermediate portion of the sub shaft 7 provided on the rear face of the tilt chassis 3.

As shown in FIG. 4, the traverse motor 5 for generating a driving force to move the optical pickup 50 in the radial direction of the optical disk 101 and the first traverse drive mechanism 10 comprising a plurality of gears are provided on the rear face of the traverse chassis 4. The first gear (the first gear in the transmission direction of the driving force) of the second traverse drive mechanism 16 provided on the tilt chassis 3 is engaged with the last gear (the last gear in the transmission direction of the driving force) of the first traverse drive mechanism 10 in the vicinity of the adjustment support portion 13 so that the driving force can be transmitted. In Embodiment 1, the engagement portion of the first traverse drive mechanism 10 and the second traverse drive mechanism 16 is provided in the vicinity of the adjustment support portion 13. Hence, the deviations of the engagement pitch and angle during tilt adjustment operation are very small, whereby the engagement relationship required for the transmission is attained.

Figure 5:
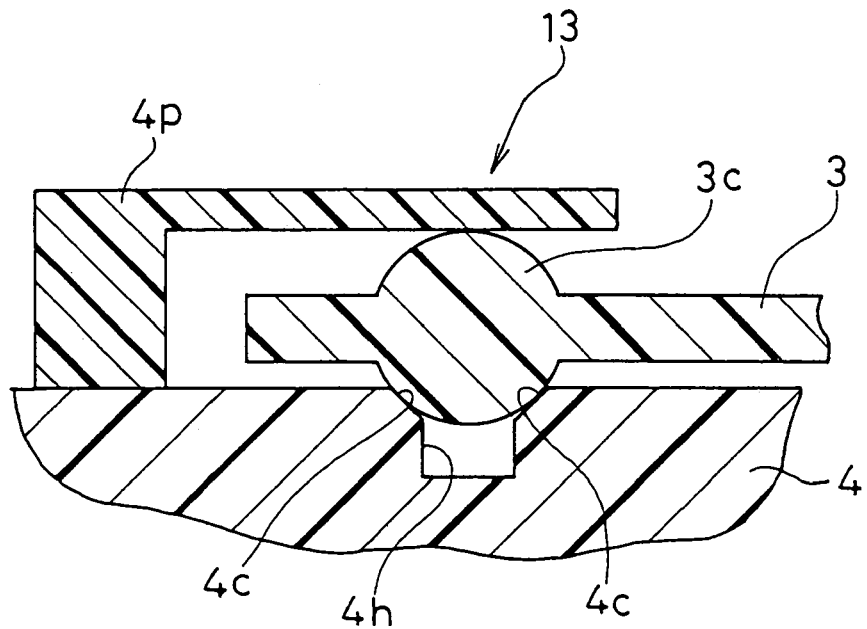
FIG. 5 is a sectional view showing the vicinity of an adjustment support portion in the optical disk apparatus in accordance with Embodiment 1.

FIG. 5 is a sectional view showing the vicinity of the adjustment support portion 13. As shown in FIG. 5, in the adjustment support portion 13, a support hole 4h is formed in the traverse chassis 4, and the opening end portion 4c of this support hole 4h is chamfered, that is, its corner is cut. The support hole 4h and the opening end portion 4c are formed coaxially. On the other hand, nearly hemispherical ball portions 3c are formed so as to protrude on both sides of the tilt chassis 3 at the position facing the opening end portion 4c, and a sphere having a diameter larger that of the opening end portion 4c is formed by the ball portions 3c formed on both sides. The ball portion 3c of the tilt chassis 3, facing the traverse chassis 4, makes contact with the opening end portion 4c of the traverse chassis 4. As shown in FIG. 5, a pressure member 4p is secured to the traverse chassis 4, and the pressure member 4p and the opening end portion 4c hold the ball portions 3c of the tilt chassis 3 therebetween. Hence, the ball portion 3c of the tilt chassis 3 facing the traverse chassis 4 is pressed to the opening end portion 4c of the traverse chassis 4. Therefore, the ball portions 3c make contact with the opening end portion 4c along a nearly ring-shaped line and also make contact with the pressure member 4p at substantially one point, whereby the tilt chassis 3 is configured so as to be rotatable nearly around the center of the ball portions 3c.

In the adjustment support portion 13 configured as described above, the center of the ball portions 3c of the tilt chassis 3 is disposed on the center line of the opening end portion 4c at all times. And, even if the tilt chassis is tilted, the center of the ball portions 3c is not moved in the direction of the height. Hence, the tilt chassis 3 is contactingly moved at the adjustment support portion 13, thereby being tiltable while the center of the support by the adjustment support portion 13 remains unchanged.

Figure 6:
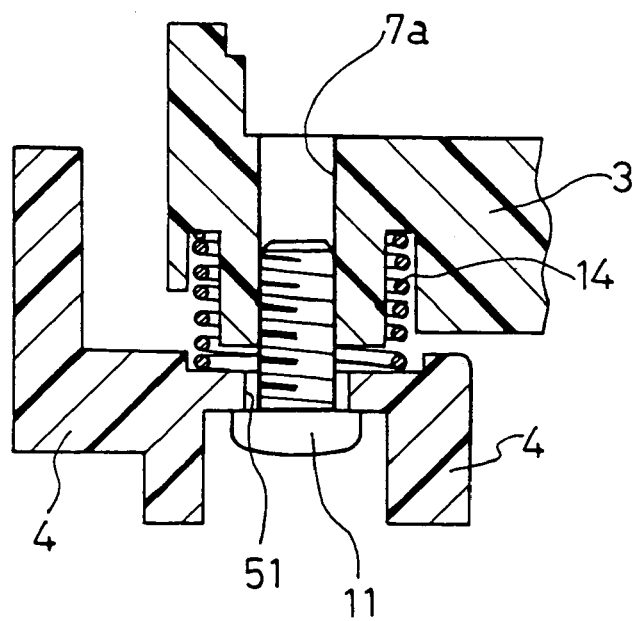
FIG. 6 is a sectional view taken on line V—V of FIG. 3.
Figure 7:
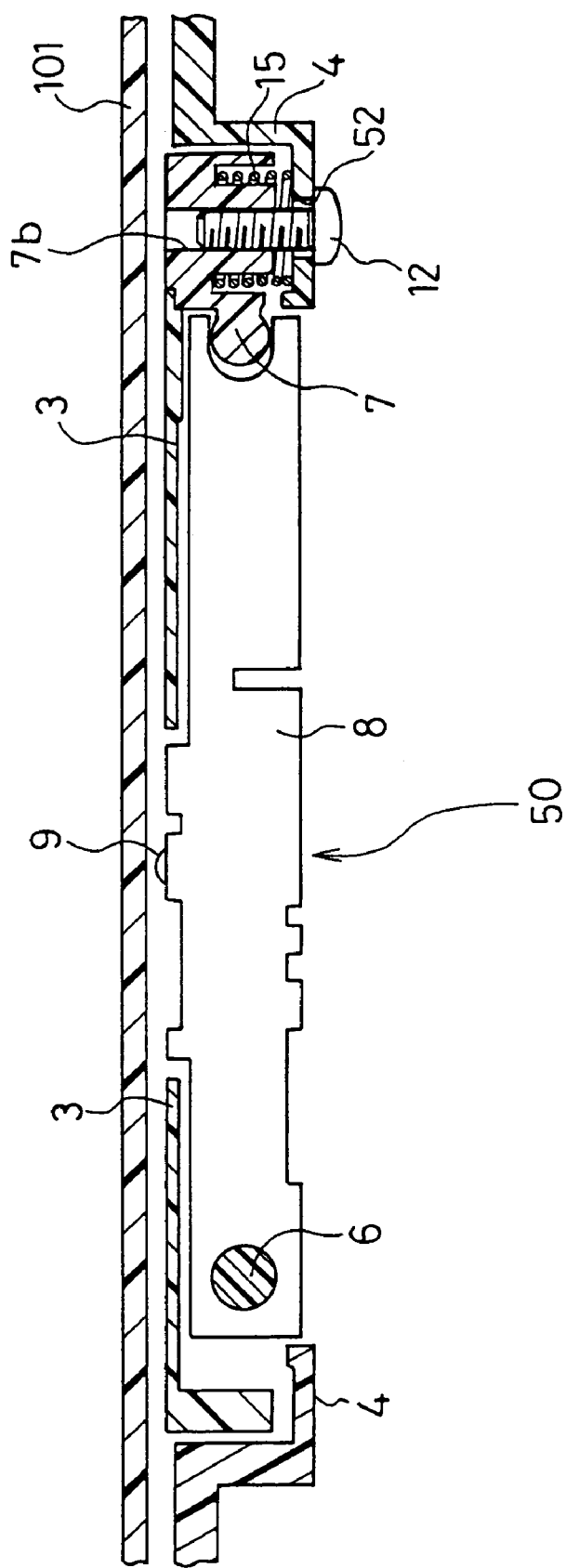
FIG. 7 is a sectional view taken on line VI—VI of FIG. 4.

Next, specific configurations of the first adjustment screw 11 and the second adjustment screw 12 of the tilt adjustment means will be described. FIG. 6 is a sectional view taken on line V—V of FIG. 3 and shows the configuration of the first adjustment screw 11. FIG. 7 is a sectional view taken on line VI—VI of FIG. 4 and shows the configuration of the second adjustment screw 12.

As shown in FIG. 6, the first adjustment screw 11 passes through the hole 51 in the traverse chassis 4 and is threadedly engaged with a threaded hole 7a formed in the tilt chassis 3. This first adjustment screw 11 passes through the spring 14 disposed between the traverse chassis 4 and the tilt chassis 3. By this spring 14, the tilt chassis 3 is pressed in the direction of being separated from the traverse chassis 4. Hence, by rotating the first adjustment screw 11, the tilt chassis 3 can be adjusted to a desired angle with respect to the traverse chassis 4 around the engagement point of the adjustment support portion 13.

As shown in FIG. 7, like the first adjustment screw 11, the second adjustment screw 12 passes through the hole 52 in the traverse chassis 4 and is threadedly engaged with a threaded hole 7b formed in the tilt chassis 3. Furthermore, the second adjustment screw 12 passes through the spring 15 disposed between the tilt chassis 3 and the traverse chassis 4. By this spring 15, the tilt chassis 3 is pressed in the direction of being separated from the traverse chassis 4. Hence, by turning the second adjustment screw 12, the turning distance of the tilt chassis 3 can be adjusted to a desired angle with respect to the traverse chassis 4 around the engagement point of the adjustment support portion 13.

After the tilt adjustment work is completed as described above, the first adjustment screw 11 and the second adjustment screw 12 are prevented from turning by locking means, such as locking paint.

Next, tilt adjustment work in the optical disk apparatus in accordance with Embodiment 1 will be described.

In Embodiment 1, the sub shaft 7 for guiding the optical pickup 50 in the radial direction of the optical disk 101 is formed so as to be integrated with the tilt chassis 3 and is disposed at a desired position in advance. Furthermore, the main shaft 6 for driving the optical pickup 50 is rotatably journaled at both ends thereof by bearings accurately configured on the tilt chassis 3 so as to be parallel with the center axis of the sub shaft 7 on the tilt chassis 3. Hence, in the tilt chassis 3, desired parallelism is securely attained between the center axis of the main shaft 6 and the center axis of the sub shaft 7. Therefore, the optical pickup 50 driven and guided by the main shaft 6 and the sub shaft 7 is configured so as to be securely moved along a straight line in the radial direction of the optical disk mounted on the turntable 1.

The tilt chassis 3 on which the main shaft 6, the sub shaft 7, the optical pickup 50 and the second traverse drive mechanism 16 are disposed in advance as described above is installed on the traverse chassis 4 on which the spindle motor 2, the first traverse drive mechanism 10, etc. are provided. The tilt chassis 3 installed on the traverse chassis 4 is tilt-adjusted by alternately turning the first adjustment screw 11 and the second adjustment screw 12 while monitoring the output signal from the optical pickup 50. In this case, since the parallelism between the main shaft 6 and the sub shaft 7 is attained, it is not necessary to adjust the two adjustment members synchronously, whereby the tilt adjustment of the tilt chassis 3 is carried out in the tangential and radial directions by simply turning the first adjustment screw 11 and the second adjustment screw 12 alternately. Therefore, the tilt adjustment work in accordance with Embodiment 1 does not require such adjustment conducted by synchronous rotation at two points as described in the columns of the prior art, thereby being capable of being carried out by using simple adjustment jigs or by manual adjustment.

By this tilt adjustment work, the laser beam from the lens projection portion 9 of the optical pickup 50 is perpendicularly applied to the recording face of the optical disk 101 mounted on the turntable 1.

In the optical disk apparatus in accordance with Embodiment 1, the main shaft 6, the sub shaft 7, the optical pickup 50, etc. are disposed at the desired positions on the tilt chassis 3, and the main shaft 6 and the sub shaft 7 are disposed in parallel on the same plane in advance, whereby the above-mentioned tilt adjustment work is carried out easily. Furthermore, in the optical disk apparatus in accordance with Embodiment 1, the main shaft 6, the sub shaft 7, the optical pickup 50, etc. are disposed in advance at the desired positions on the tilt chassis 3, which is separate from the traverse chassis 4, as described above. Hence, during the tilt adjustment work, it is not necessary to secure extra space for adjustment in the apparatus in advance between the tilt chassis 3 and the optical disk 101 to be mounted. Hence, in the optical disk apparatus in accordance with Embodiment 1, the main face of the tilt chassis 3 for supporting the optical pickup 50 can be secured even in the limited space between the lower face of the disk and the main body of the optical pickup 50. The configuration of Embodiment 1 greatly contributes to the profile reduction of the apparatus.

In addition, in Embodiment 1, an example wherein the second adjustment screw 12 is disposed in the nearly intermediate portion of the sub shaft 7 has been explained. To make the tilt adjustment work easier, the second adjustment screw 12 can also be disposed on a straight line (the straight line indicated by letter B in FIG. 3) that is orthogonal to the straight line A including the movement path of the lens projection portion 9 and passes through the center of the turntable 1. In this case, the adjustment work is made further easier by disposing the adjustment support position 13 on the straight line B. However, in this case, in order to maintain the tilt chassis at the desired position, it is preferable to provide freely-movable supporting means formed of an elastic body or the like in the vicinity of the fringe portion thereof.

Furthermore, in Embodiment 1, the tilt chassis 3 is configured so as to be held to the traverse chassis 4 by the springs 14 and 15. The tilt chassis 3 can also be configured so as to be held on the traverse chassis 4 by vibration absorbing means formed of an elastic body or the like for absorbing vibration instead of these springs 14 and 15.

In the optical disk apparatus in accordance with Embodiment 1 configured as described above, since the tilt chassis for substantially covering the optical components and the drive mechanisms is provided, this tilt chassis also has a function for serving as a blind for the user and prevents fine-grain dust owing to air current produced by the rotation of the optical disk from entering the optical components and other devices. As a result, the problems of reduction in performance, impossible reproduction, etc. due to decrease in the amount of light caused by fine-grain dust adhering to and staining the optical components with the passage of long time are solved.

Still further, by providing the tilt chassis and the traverse chassis configured as described above, the optical disk apparatus in accordance with Embodiment 1 can prevent the optical components from being stained and can attain reduction in profile, thereby having efficient effects.

<<Embodiment 2>>

Figure 8:
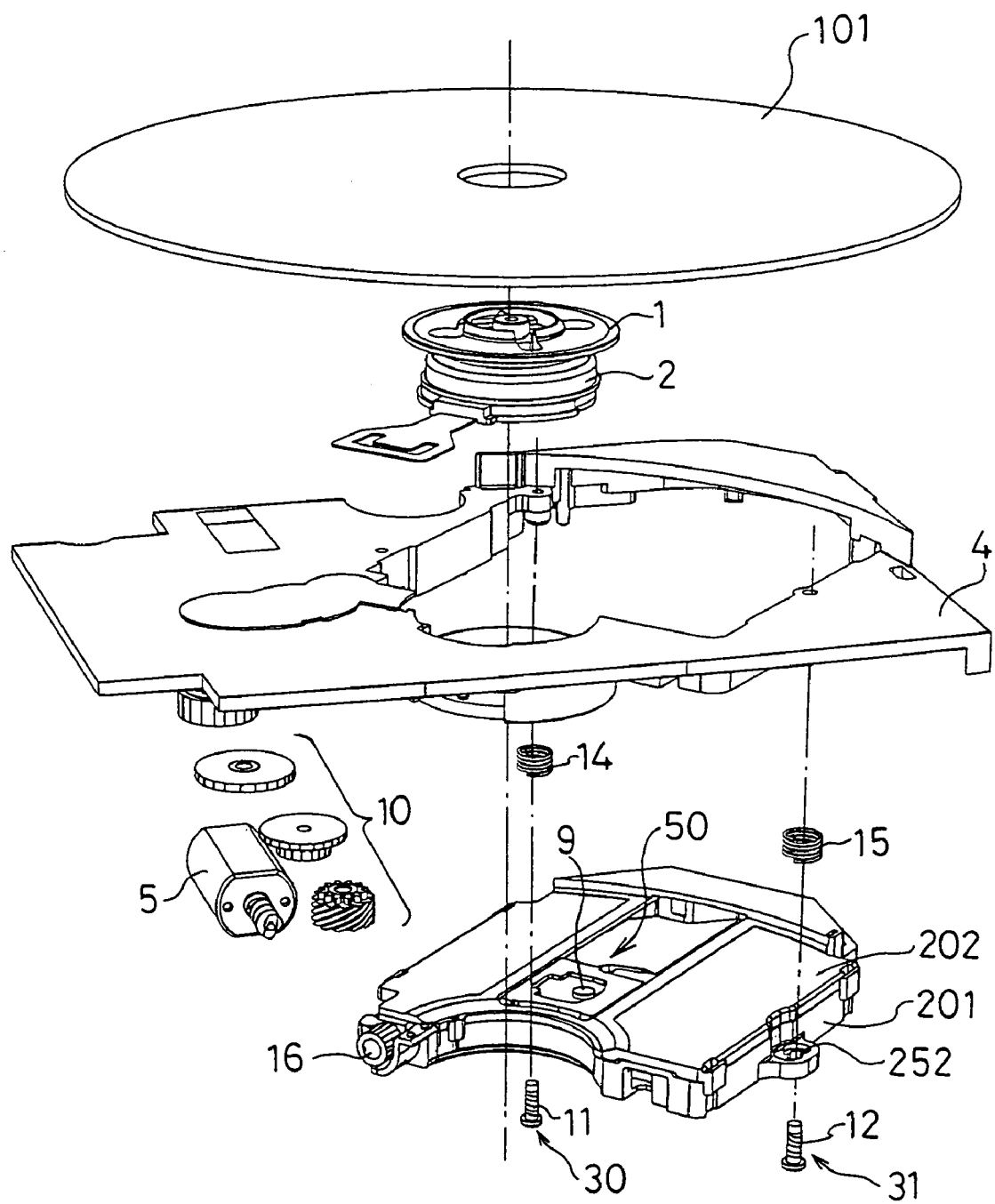
FIG. 8 is a perspective view showing components in the vicinity of a spindle motor in an optical disk apparatus in accordance with Embodiment 2 of the present invention, taken from above (on the side of an optical disk mounted on a turntable)
Figure 9:
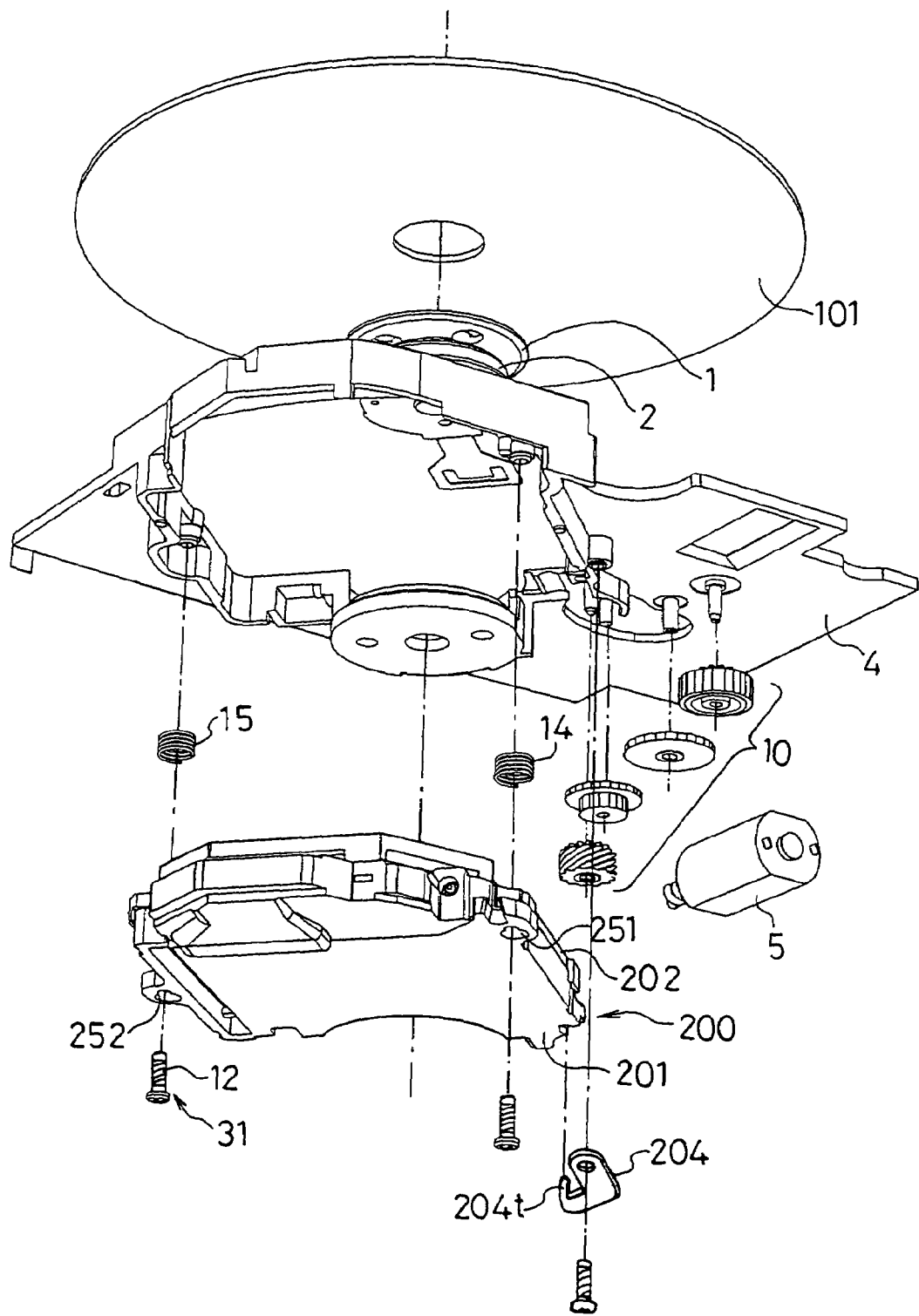
FIG. 9 is a perspective view showing the components in the vicinity of the spindle motor in the optical disk apparatus in accordance with Embodiment 2, taken from below.
Figure 10:
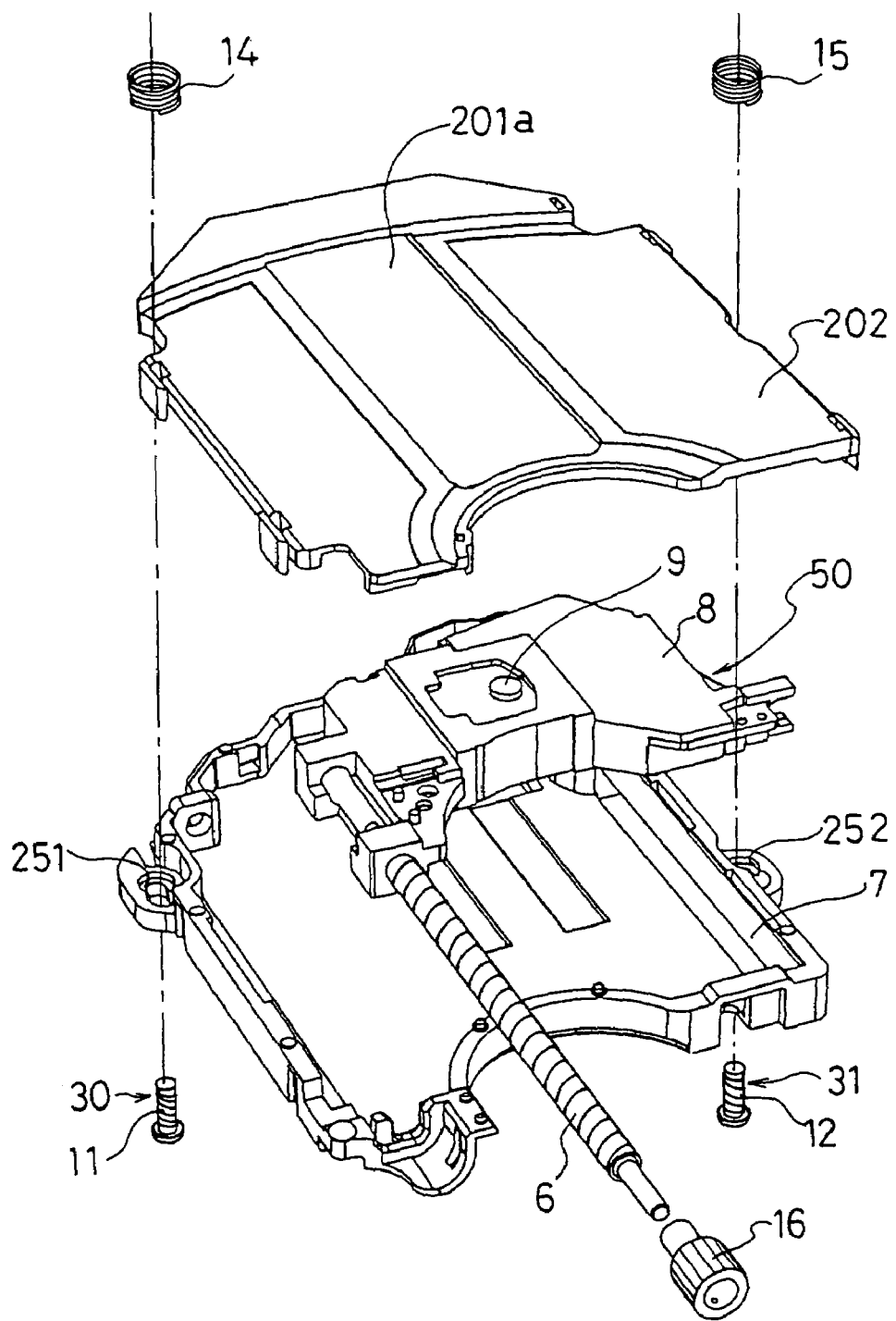
FIG. 10 is a perspective view showing an optical pickup unit in accordance with Embodiment 2, taken from above.
Figure 11:
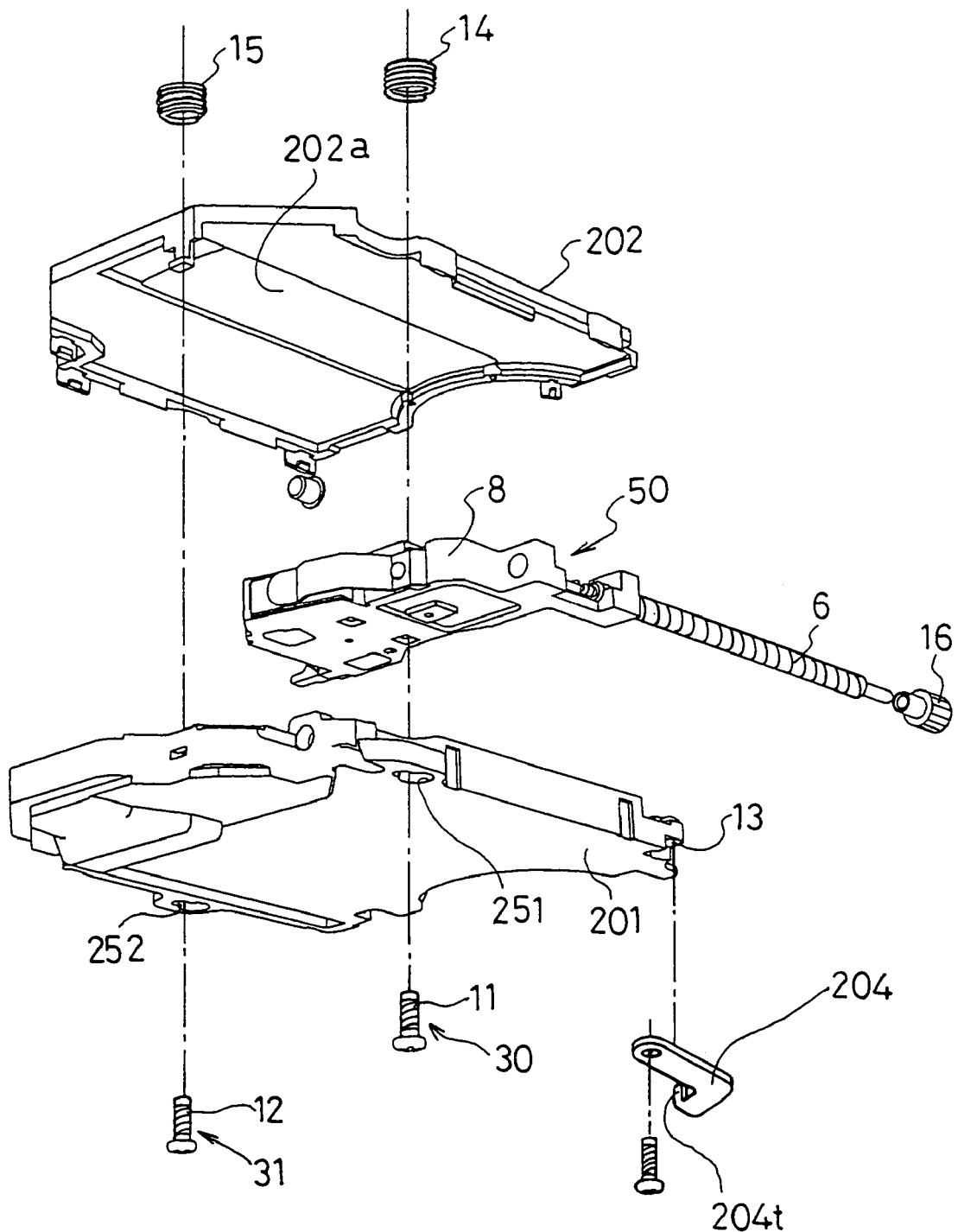
FIG. 11 is a perspective view showing the optical pickup unit of FIG. 10.

FIG. 8 is a perspective view showing components in the vicinity of a spindle motor in an optical disk apparatus in accordance with Embodiment 2 of the present invention, taken from above (on the side of an optical disk mounted on a turntable). FIG. 9 is a perspective view showing the components in the vicinity of the spindle motor in the optical disk apparatus in accordance with Embodiment 2, taken from below. FIG. 10 is a perspective view showing components in the vicinity of an optical pickup in accordance with Embodiment 2, taken from above, and FIG. 11 is a perspective view showing the components in the vicinity of the optical pickup of FIG. 10, taken from below. In each figure in accordance with Embodiment 2, components having the same functions and configurations as those of the components of the optical disk apparatus in accordance with the above-mentioned Embodiment 1 are designated by the same numerals and their explanations are omitted.

In FIG. 8, a turntable 1 on which an optical disk 101 is mounted is directly connected to the rotation shaft of a spindle motor 2, and the spindle motor 2 is secured to a traverse chassis 4. A traverse motor 5 and a first traverse drive mechanism 10 for transmitting the driving force of the motor are provided on the rear face of this traverse chassis 4.

As shown in FIG. 8 and FIG. 9, in the optical disk apparatus in accordance with Embodiment 2, an optical pickup unit 200 is installed on the traverse chassis 4. This optical pickup unit 200 is engaged with an adjustment support portion 13 so as to be contactingly movable and locked at two points, that is, tilt adjustment portions 30 and 31. The optical pickup unit 200 has a tilt chassis 201 and a tilt chassis cover 202 for covering the upper face of the tilt chassis 201. Inside this optical pickup unit 200, an optical pickup 50, a main shaft 6 for driving the optical pickup 50 in the radial direction of the optical disk 101 and a sub shaft 7 serving as a guide shaft are provided.

The optical pickup 50 comprises a lens projection portion 9 for applying light to the optical disk 101 and an optical pickup body 8 for supporting this lens projection portion 9 so as to be movable in the radial direction of the optical disk 101. In. Embodiment 2, the main face of the tilt chassis 201 is disposed on the lower side of the optical pickup body 8.

Embodiment 2 differs from the above-mentioned Embodiment 1 in that the main shaft 6, the sub shaft 7 and the optical pickup 50 are configured so as to be enveloped with the tilt chassis 201 and the tilt chassis cover 202 in the vertical direction. The tilt chassis cover 202 is configured so as to be engaged with and locked to the tilt chassis 201. In Embodiment 2, by providing the tilt chassis cover 202 as described above, the rigidity of the tilt chassis 201 for holding various components can be raised, and air current produced by the rotation of the optical disk 101 is prevented from entering the optical components of the optical pickup 50.

The optical pickup unit 200 is configured so as to be tilt-adjustable with respect to the traverse chassis 4 by the tilt adjustment portions 30 and 31 serving as tilt adjustment means. As shown in FIG. 9, in Embodiment 2, the tilt adjustment portions 30 and 31 comprise two sets of adjustment screws 11 and 12 and springs 14 and 15, and the adjustment screws 11 and 12 pass through holes 251 and 252 formed in the tilt chassis 201 and the springs 14 and 15 and are threadedly engaged with the traverse chassis 4.

In Embodiment 2, the optical pickup unit 200 is configured so as to be mounted on the rear face side of the traverse chassis 4. With this configuration, in the case when the optical pickup 50 of the optical disk apparatus is replaced, it is not necessary to remove various components mounted on the upper face (the face on the side of the optical disk) of the traverse chassis 4, for example, a damper for pressing and securing the optical disk 101 to the face of the turntable and a loading mechanism for loading the optical disk 101 on the turntable, whereby the maintenance of the optical pickup 50 is made easy in the optical disk apparatus.

In Embodiment 2, the tilt chassis 201 is provided with the main shaft 6 serving as a drive guide for the optical pickup body 8 in the radial direction of the optical disk 101 and the sub shaft 7 serving as a guide shaft. A thread is formed on the main shaft 6, and the optical pickup body engaged with this main shaft 6 is configured so as to be moved linearly by the rotation of the main shaft 6. The sub shaft 7 is formed so as to be integrally molded with the tilt chassis 201. In addition, a second traverse drive mechanism 16 threadedly engaged with the first traverse drive mechanism. 10 provided on the traverse chassis 4 is provided on the tilt chassis 201, and the driving force of the traverse motor 5 is transmitted to the main shaft 6 via the first traverse drive mechanism 10 provided on the rear face of the traverse chassis 4 and the second traverse drive mechanism 16 provided on the tilt chassis 201. The connection portion between the first traverse drive mechanism 10 and the second traverse drive mechanism 16 is disposed in the vicinity of the adjustment support portion 13 that supports the tilt chassis 201 on the traverse chassis 201 while having engagement therewith.

FIG. 10 is an exploded perspective view showing the optical pickup unit 200 of the optical disk apparatus in accordance with Embodiment 2, taken from above, and FIG. 11 is an exploded perspective view showing the optical pickup unit 200 of FIG. 10, taken from below.

As shown in FIG. 10 and FIG. 11, one opening portion 202a is formed in the tilt chassis cover 202. This opening portion 202a is formed along the movement path of the lens projection portion 9 so that the lens projection portion 9 of the optical pickup 50 can see the recording face of the optical disk 101 mounted on the turntable 1.

As shown in FIG. 10 and FIG. 11, the first adjustment screw 11 and the second adjustment screw 12 of the tilt adjustment means in accordance with Embodiment 2 are provided in the vicinity of the fringe portion of the tilt chassis 201 and disposed on both sides of a straight line including the movement path of the lens projection portion 9 of the optical pickup 50. The adjustment support portion 13 and the first adjustment screw 11 are provided in the vicinities of both ends of the main shaft 6 provided on the upper face of the tilt chassis 201, the adjustment support portion 13 is in the vicinity of the end of the main shaft 6 on the inner circumferential side of the optical disk, and the first adjustment screw 11 is in the vicinity of the end of the main shaft 6 on the outer circumferential side of the optical disk. Hence, the adjustment support portion 13 and the first adjustment screw 11 are disposed on the same side of a straight line including the movement path of the lens projection portion 9 and serving as a boundary.

Furthermore, as shown in FIG. 10 and FIG. 11, the second adjustment screw 12 is disposed in the nearly intermediate portion of the sub shaft 7 provided on the upper face of the tilt chassis 201.

In addition, in Embodiment 2, an example wherein the second adjustment screw 12 is disposed in the nearly intermediate portion of the sub shaft 7 is explained. To make the tilt adjustment work easier, the second adjustment screw 12 can also be disposed on a straight line being orthogonal to the straight line including the movement path of the lens projection portion 9 and passing through the center of the turntable 1. In this case, the adjustment work is made further easier by disposing the adjustment support position 13 on the straight line B. However, in this case, in order to maintain the tilt chassis at the desired position, it is preferable to provide supporting means formed of an elastic body or the like in the vicinity of the fringe portion thereof.

In Embodiment 2, just as in the case of the above-mentioned Embodiment 1, the first gear (the first gear in the transmission direction of the driving force) of the second traverse drive mechanism 16 provided on the tilt chassis 201 is engaged with the last gear (the last gear in the transmission direction of the driving force) of the first traverse drive mechanism 10 in the vicinity of the adjustment support portion 13. In Embodiment 2, the engagement portion of the first traverse drive mechanism 10 and the second traverse drive mechanism 16 is provided in the vicinity of the adjustment support portion 13; hence, the deviations of the engagement pitch and angle during tilt adjustment operation are very small, whereby the engagement relationship required for the transmission is attained.

The first adjustment screw 11 and the second adjustment screw 12 serving as the tilt adjustment means in accordance with Embodiment 2 have substantially the same configuration as that in accordance with the aforementioned Embodiment 1.

The first adjustment screw 11 passes through the hole 251 in the tilt chassis 201 and is threadedly engaged with a threaded hole formed in the traverse chassis 4. This first adjustment screw 11 passes through the spring 14 disposed between the optical pickup unit 200 and the traverse chassis 4. By this spring 14, the optical pickup unit 200 is pressed in the direction of being separated from the traverse chassis 4. Hence, by rotating the first adjustment screw 11, the optical pickup unit 200 can be adjusted to a desired angle with respect to the traverse chassis 4 around the engagement point of the adjustment support portion 13.

Like the first adjustment screw 11, the second adjustment screw 12 passes through the hole 252 in the tilt chassis 201 and is threadedly engaged with a threaded hole formed in the traverse chassis 4. Furthermore, the second adjustment screw 12 passes through the spring 15 disposed between the optical pickup unit 200 and the traverse chassis 4. By this spring 15, the optical pickup unit 200 is pressed in the direction of being separated from the traverse chassis 4. Hence, by turning the second adjustment screw 12, the optical pickup unit 200 can be adjusted to a desired angle with respect to the traverse chassis 4 around the engagement point of the adjustment support portion 13.

After the tilt adjustment work is completed as described above, the first adjustment screw 11 and the second adjustment screw 12 are prevented from turning by locking means, such as locking paint.

Figure 12:
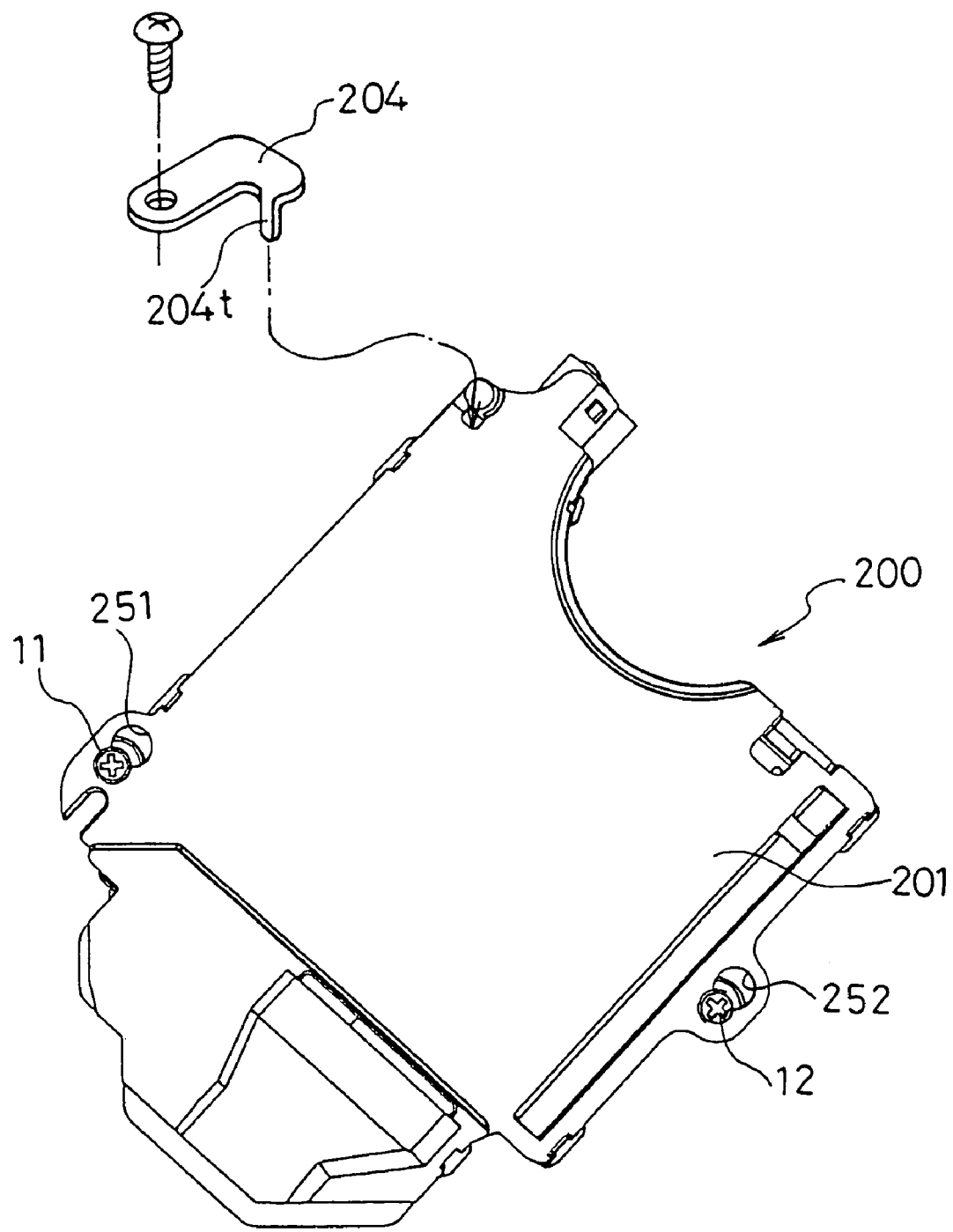
FIG. 12 is a rear view showing the optical pickup unit in accordance with Embodiment 2.

FIG. 12 is a rear view showing the optical pickup unit 200 in accordance with Embodiment 2.

As shown in FIG. 12, each of the holes 251 and 252 has a shape obtained by partially superimposing a large circle and a small circle (the shape of a potbelly). The diameter of the large circle portion is made larger than the diameter of the head portions of the first adjustment screw 11 and the second adjustment screw 12, and the diameter of the small circle portion is made smaller than the diameter of the head portions of the first adjustment screw 11 and the second adjustment screw 12 and made larger than the threaded portions thereof. Since the holes 251 and 252 are formed as described above, by engaging the head portions of the first adjustment screw 11 and the second adjustment screw 12 with the small circle portions of the holes 251 and 252, respectively, during assembly, the optical pickup unit 200 can be held and secured to the traverse chassis 4. After the optical pickup unit 200 is held and secured to the traverse chassis 4 as described above, tilt adjustment work is carried out. Hence, the optical pickup unit 200 can be mounted easily on the traverse chassis 4, and the tilt adjustment can be carried out. Furthermore, work for removing the optical pickup is facilitated as described later.

The tilt adjustment work for the optical disk apparatus in accordance with Embodiment 2 is substantially the same as the tilt adjustment work in accordance with the aforementioned Embodiment 1.

In Embodiment 2, the sub shaft 7 for guiding the optical pickup 50 in the radial direction of the optical disk 101 is formed so as to be integrated with the tilt chassis 201 and is disposed at a desired position in advance. Furthermore, the main shaft 6 for driving the optical pickup 50 is rotatably journaled at both ends thereof by bearings accurately configured on the tilt chassis 201 so as to be parallel with the center axis of the sub shaft 7 on the tilt chassis 201. Hence, in the tilt chassis 201, desired parallelism is securely attained between the center axis of the main shaft 6 and the center axis of the sub shaft 7. Therefore, the optical pickup 50 driven and guided by the main shaft 6 and the sub shaft 7 is configured so as to securely move along a straight line in the radial direction of the optical disk 101 mounted on the turntable 1.

As described above, in Embodiment 2, the tilt chassis cover 202 is installed on the tilt chassis 201 on which the main shaft 6, the sub shaft 7, the optical pickup 50 and the second traverse drive mechanism 16 are disposed in advance, thereby forming the optical pickup unit 200. This optical pickup unit 200 is installed on the rear face of the traverse chassis 4 and tilt-adjusted by alternately turning the first adjustment screw 11 and the second adjustment screw 12 while monitoring the output signal from the optical pickup 50. In this case, since the parallelism between the main shaft 6 and the sub shaft 7 is attained, it is necessary to adjust the two adjustment members synchronously; the tilt adjustment of the optical pickup unit 200 is carried out in the tangential and radial directions by simply rotating the first adjustment screw 11 and the second adjustment screw 12 alternately. Therefore, the tilt adjustment work in accordance with Embodiment 2 does not require such adjustment conducted by synchronous rotation at two points as described in the columns of the prior art, thereby being capable of being carried out by using simple adjustment jigs or by manual adjustment.

By this tilt adjustment work, the laser beam from the lens projection portion 9 of the optical pickup 50 is perpendicularly applied to the recording face of the optical disk 101 mounted on the turntable 1.

Work for removing the optical pickup from the optical disk apparatus in accordance with Embodiment 2 configured as described above will be described below. The configuration of the adjustment support portion between the tilt chassis 201 and the traverse chassis 4 is substantially the same as that of the adjustment support portion 13 described by using FIG. 5 in the aforementioned Embodiment 1.

As described above, the optical pickup 50 is guided and driven by the main shaft 6 and the sub shaft 7 formed accurately on the tilt chassis 201. In addition, the tilt chassis 201 and the traverse chassis 4 are configured so as to be tilt-adjusted accurately by the tilt adjustment portion comprising the adjustment support portion 13, the first adjustment screw 11 and the second adjustment screw 12, serving as tilt adjustment means. As described by using FIG. 5 in the aforementioned Embodiment 1, the positional accuracy of the engagement fulcrum between the tilt chassis 3 and the traverse chassis 4 is determined by the component accuracy of the ball portions 3c formed on the tilt chassis 3, the opening end portion 4c and the support hole 4h of the traverse chassis 4. Hence, even if the contactingly moving state of the engagement portion at the adjustment support portion 13 is canceled by removing the pressure member 4p for pressing the ball portion 3c, the positional accuracy of the engagement fulcrum can be obtained by carrying out reassembling and by applying pressure from the pressure member 4p.

In the optical disk apparatus in accordance with Embodiment 2, a pressure member 204 is screwed to the traverse chassis 4 so as to press a ball portion (not shown) formed on the tilt chassis 201 as shown in FIG. 9, FIG. 11 and FIG. 12. Hence, also in Embodiment 2, even if the contactingly moving state of the engagement portion at the adjustment support portion 13 is canceled by removing the pressure member 204 for pressing the ball portion, the positional accuracy of the engagement fulcrum between the tilt chassis 201 and the traverse chassis 4 can be obtained by carrying out reassembling and by applying pressure from the pressure member 204.

Next, at the tilt adjustment portion wherein tilt adjustment is carried out by adjusting the first adjustment screw. 11 and the second adjustment screw 12, the first adjustment screw 11 and the second adjustment screw 12 are locked so as not to rotate by locking paint or the like as described above. However, in the tilt chassis 201 separated from the traverse chassis 4 by the springs 14 and 15 serving as biasing means and pressed by the first adjustment screw 11 and the second adjustment screw 12, the engagement state can be canceled by applying pressure against the biasing direction of the springs 14 and 15. In other words, since the tilt chassis 201 is held and secured by the first adjustment screw 11 and the second adjustment screw 12 at the small circle portions of the holes 251 and 252 each formed of a large circle portion and a small circle portion connected to each other, the holding and securing by the first adjustment screw 11 and the second adjustment screw 12 can be canceled at the large circle portions of the holes 251 and 252 by sliding the tilt chassis while pressing it.

By removing the pressure member 204 and by sliding the tilt chassis 201 while pressing it as described above, the tilt chassis 201 can be removed from the traverse chassis 4 without rotating the first adjustment screw 11 and the second adjustment screw 12 serving as adjustment points.

On the other hand, also in the case when the tilt chassis 201 is installed on the traverse chassis 4, by taking the reverse procedure of the above-mentioned removal procedure, reinstallation is made possible while the tilt adjustment is maintained, without adversely affecting the adjustment at all.

More specifically, the tilt chassis 201 is held by the pressure member 204 shown in FIG. 12 at the adjustment support portion 13. The pressure member 204 is basically similar to the aforementioned pressure member 4p in accordance with Embodiment 1 described by using FIG. 5 and presses the ball portion formed at a predetermined position of the tilt chassis 201. The pressure member 204 in accordance with Embodiment 2 differs from the pressure member 4p shown in FIG. 5 in that a tab 204t is provided and that this tab 204t is inserted into a dent portion 201m formed in the tilt chassis 201 while having a gap therein. With this configuration, the optical pickup unit 200 cannot slide because of the engagement between the tab 204t and the dent portion 201m, unless the pressure member 204 is disengaged from the traverse chassis 4. Furthermore, even if the optical pickup unit 200 should be likely to slide owing to the decrease in the biasing forces of the springs 14 and 15 of the tilt adjustment portion owing to vibration or the like, the tab 204t of the pressure member 204 engages the dent portion 201m, thereby preventing sliding. Still further, the tab 204t is loosely inserted into the dent portion 201m while having a predetermined gap so as not to make contact therewith in the range of the tilt adjustment, whereby the tilt adjustment work is not hindered.

In Embodiment 2, the optical pickup unit 200 is configured so as to be held to the traverse chassis 4 by the springs 14 and 15; however, the optical pickup unit 200 can also be configured so as to be held to the traverse chassis 4 by vibration absorbing means formed of an elastic body or the like for absorbing vibration instead of these springs 14 and 15.

In the optical disk apparatus in accordance with Embodiment 2, the main shaft 6, the sub shaft 7, the optical pickup 50, etc. are disposed at the desired positions inside the optical pickup unit 200, and the main shaft 6 and the sub shaft 7 are disposed in parallel on the same plane in advance, whereby the above-mentioned tilt adjustment is carried out easily. Furthermore, in the optical disk apparatus in accordance with Embodiment 2, the main shaft 6, the sub shaft 7, the optical pickup 50, etc. are disposed in advance at the desired positions on the optical pickup unit 200, which is separate from the traverse chassis 4, as described above; hence, during the tilt adjustment work, it is not necessary to secure extra space for adjustment in the apparatus in advance between the optical pickup unit 200 and the optical disk 101 to be mounted, thereby greatly contributing to the profile reduction of the apparatus.

In the optical disk apparatus in accordance with Embodiment 2 configured as described above, since the tilt chassis cover 202 for substantially covering the optical components and the drive mechanisms is provided, this tilt chassis cover 202 also has a function for serving as a blind for the user. Furthermore, in the optical disk apparatus in accordance with Embodiment 2, since the optical pickup body 8 is accommodated inside the optical pickup unit 200, fine-grain dust owing to air current produced by the rotation of the optical disk 101 is prevented from entering the optical components and other devices. As a result, the problems of reduction in performance, impossible reproduction, etc. due to decrease in the amount of light caused by dust adhering to and staining the optical components inside the optical pickup body 8 with the passage of long time are solved.

<<Embodiment 3<<

Next, a height adjustment device in an optical disk apparatus in accordance with Embodiment 3 of the present invention will be described by using the accompanying FIG. 13. The height adjustment device that is described in Embodiment 3 is used for the tilt adjustment of the optical disk apparatus and is also applicable as a height adjustment device for adjusting the distance (height) between a chassis and a sub chassis for use in general electric appliances.

Figure 13:
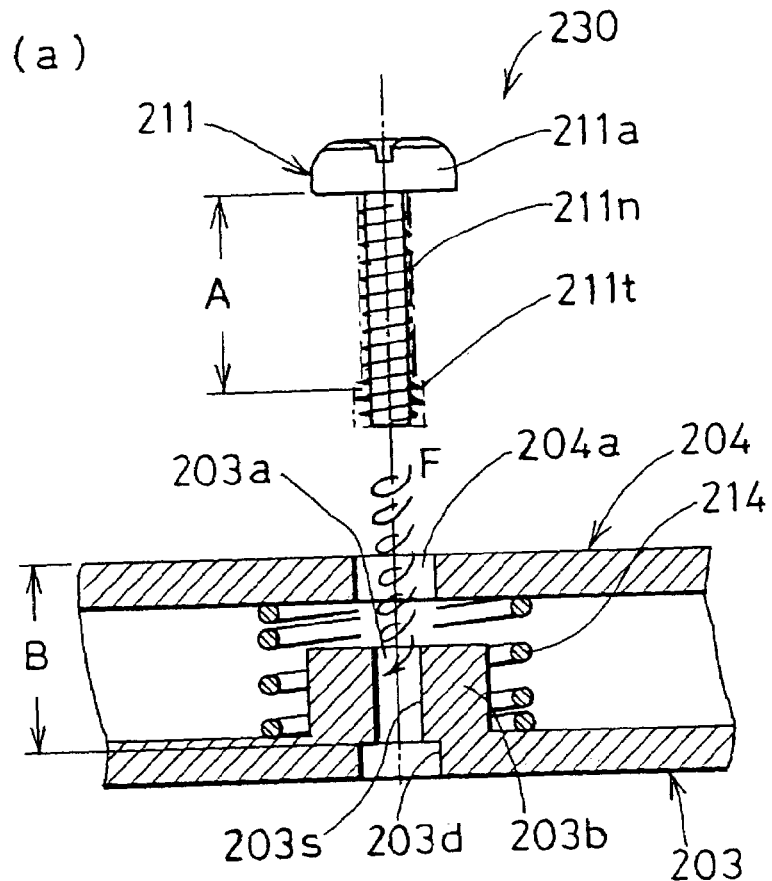
FIG. 13 is a sectional view showing the configuration of an adjustment device in accordance with Embodiment 1 of the present invention.
Figure 13:
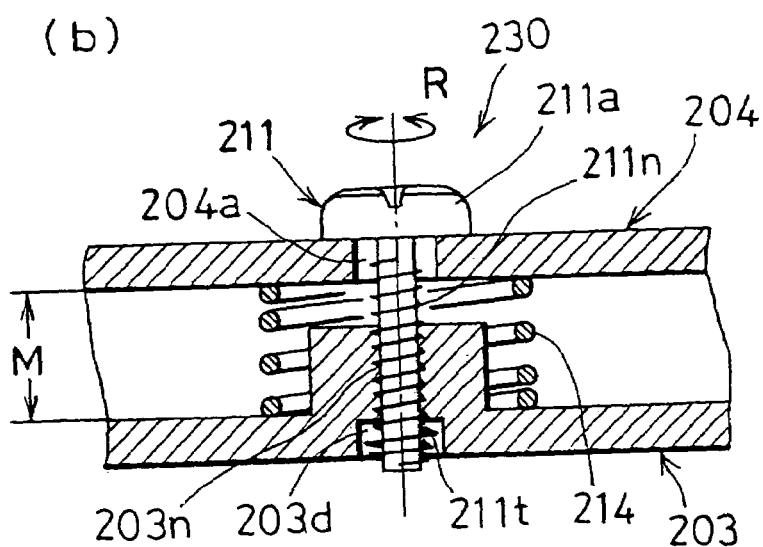
Figure 14:
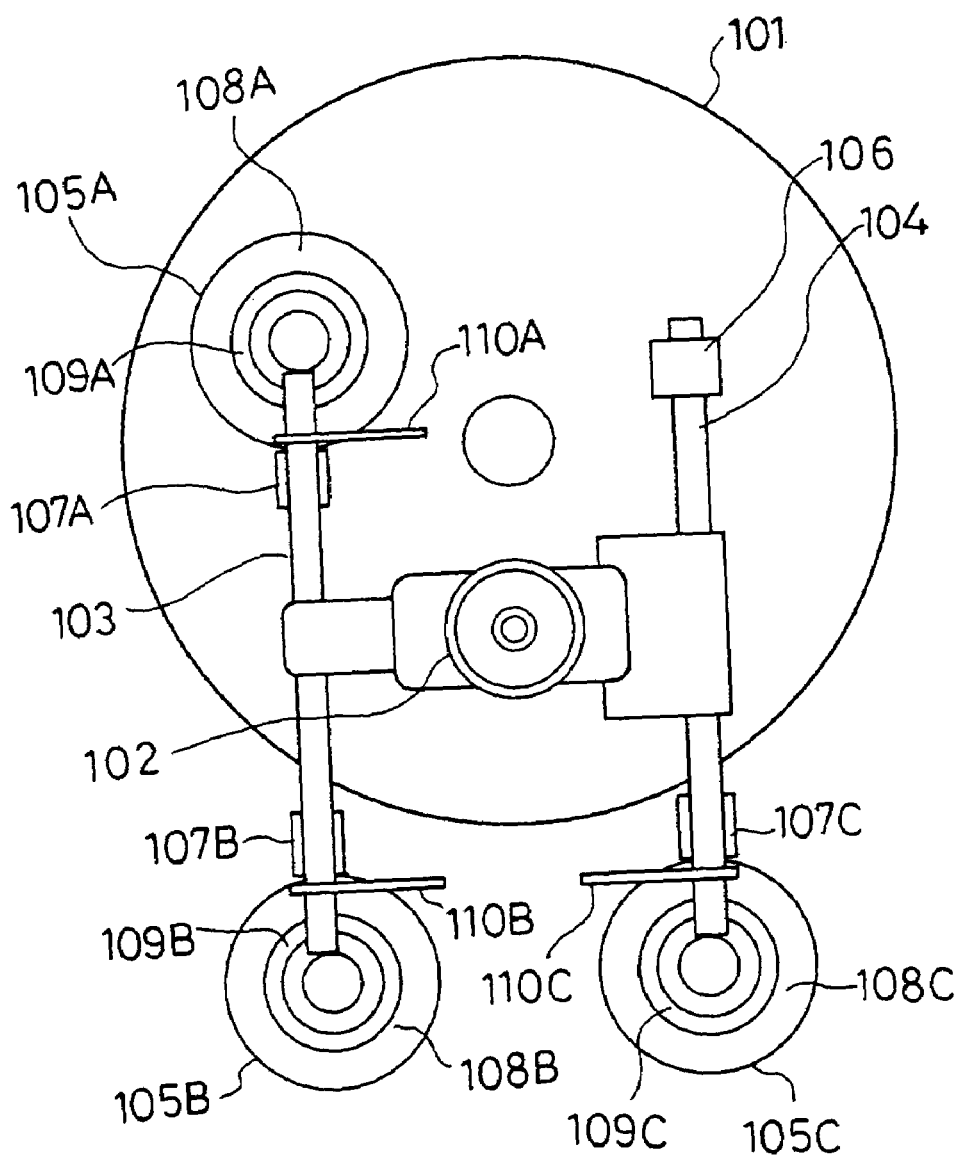
FIG. 14 is a plan view showing a tilt adjustment mechanism in the prior-art optical disk apparatus.
Figure 15:
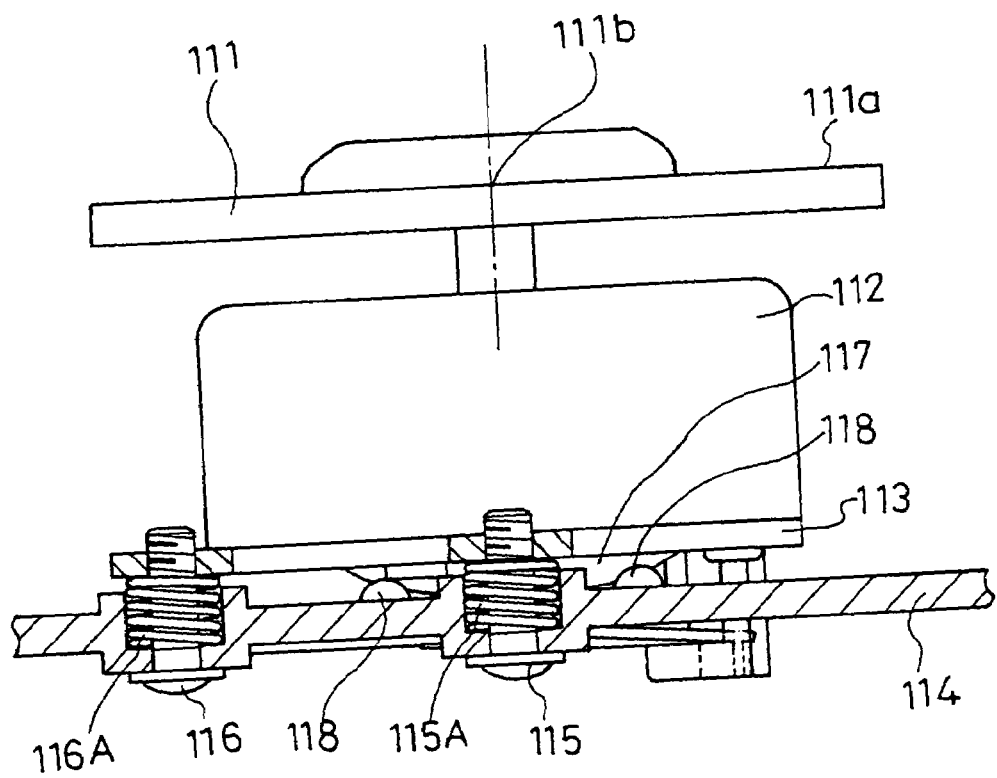
FIG. 15 is a side sectional view showing another tilt adjustment mechanism in the prior-art optical disk apparatus.

FIG. 13 is a sectional view showing the configuration of the height adjustment device in the optical disk apparatus in accordance with Embodiment 3 of the present invention. In FIG. 13, the portion (a) shows a state before an adjustment screw 211 is installed in a sub chassis 203 and a chassis 204, and the portion (b) shows a state wherein the adjustment screw 211 is installed in the sub chassis 203 and the chassis 204.

In the following descriptions, the sub chassis and the chassis correspond to the tilt chassis and the traverse chassis in accordance with the above-mentioned embodiments, and the distance (height) between the sub chassis and the chassis is adjusted by the height adjustment device. In Embodiment 3, the chassis 204 and the sub chassis 203 are disposed so as to face each other, and the distance therebetween is adjusted by a height adjustment device 230 as described below. In FIG. 13, the adjustment screw is indicated so as to be inserted into the chassis 204 and the sub chassis 203 from above.

As shown in FIG. 13, a boss portion 203b protruding toward the chassis 204 is formed on the sub chassis 203. An adjustment hole 203a is formed in this boss portion 203b, a female thread 203s is formed during an assembly process by the adjustment screw 211 as described later. At the position facing the adjustment hole 203a in the sub chassis 203, a through hole 204a is formed in the chassis 204 disposed so as to have a predetermined distance from the sub chassis 203. The adjustment screw 211 is inserted into and passed through this through hole 204a and screwed into the adjustment hole 203a.

An adjustment spring 214 is provided between the sub chassis 203 and the chassis 204 in the vicinity of the adjustment screw 211 to be installed. In Embodiment 3, this adjustment spring 214 is the so-called helical spring, and the adjustment screw 211 is configured so as to pass through the substantial center of the helical spring. In order that the adjustment spring 214, that is, a helical spring, is installed so as to enclose the boss portion 203b of the sub chassis 203, the diameter of the boss portion 203b is made slightly smaller than the diameter of the spring.

As described above, the adjustment spring 214 is disposed so as to be held between the sub chassis 203 and the chassis 204, whereby the sub chassis 203 and the chassis 204 are biased in the direction of being separated from each other. Hence, the chassis 204 is locked by the head portion 211a of the adjustment screw 211 that is screwed into the adjustment hole 203a in the sub chassis 203, whereby the distance (height) between the sub chassis 203 and the chassis 204 is determined. Since the boss portion 203b of the sub chassis 203 is configured so as to be inserted into the adjustment spring 214 as described above, a portion (a threaded portion 203n) threaded inside the adjustment hole 203a can securely have a length required for the engagement with the adjustment screw 211. Furthermore, since the boss portion 203b is a protrusion, the adjustment spring 214 can be assembled easily at its predetermined position during the assembly process.

Figure 16:
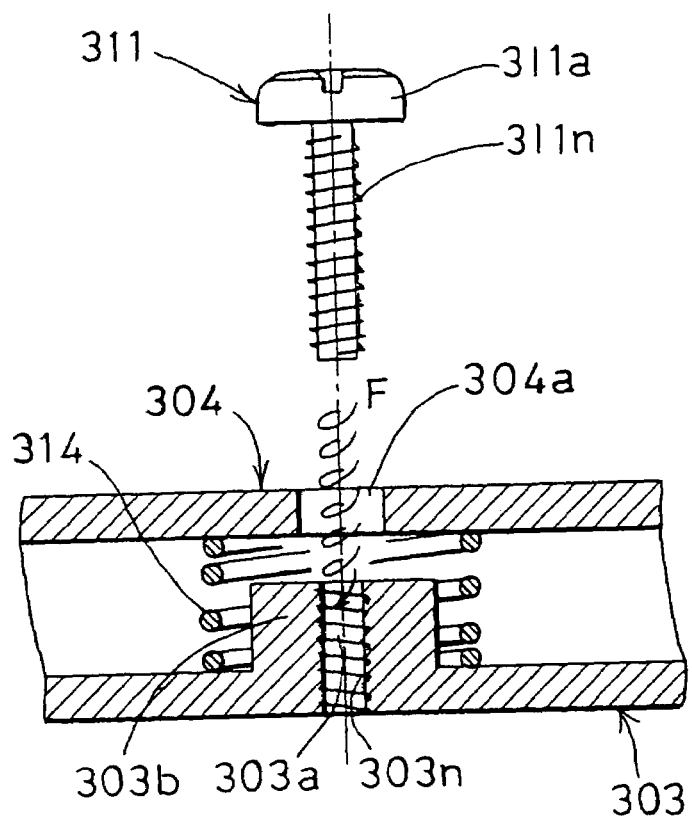
FIG. 16 is a sectional view showing the configuration of a height adjustment device of the prior art.
Figure 16:
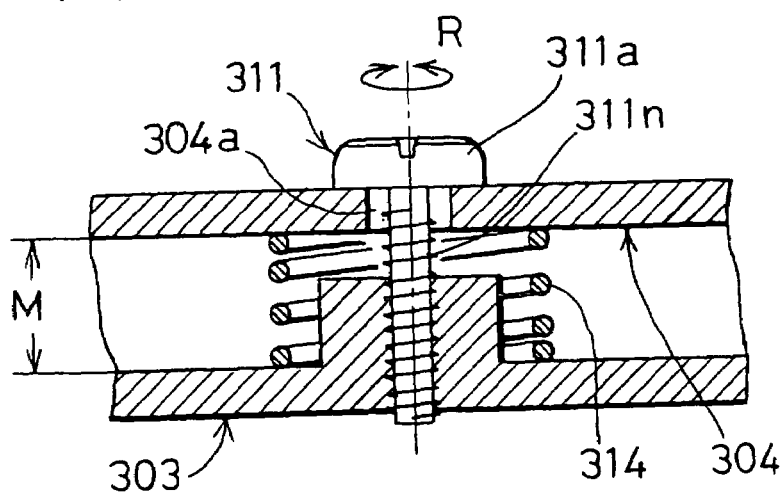
Figure 17:
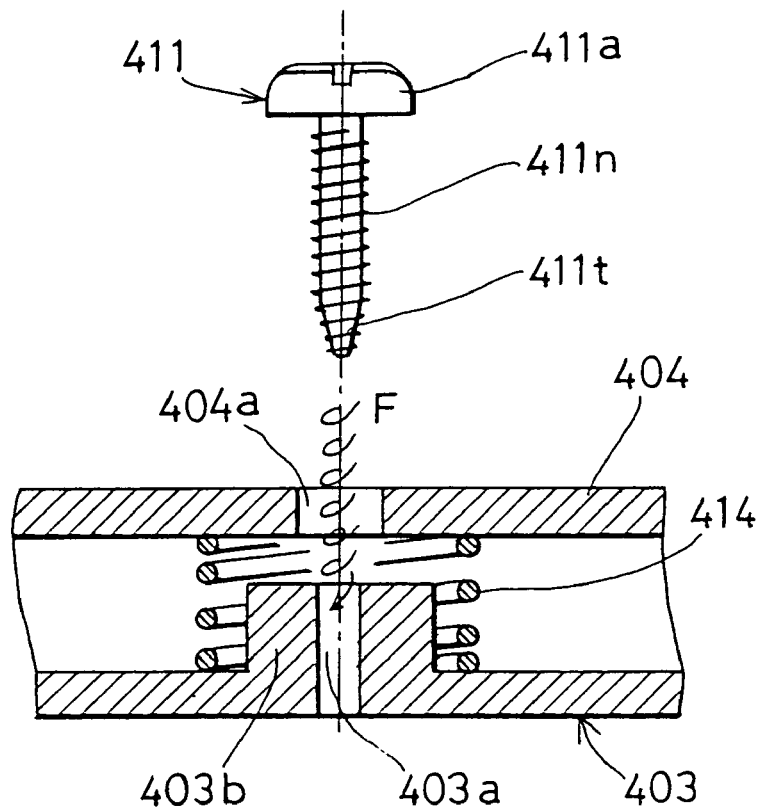
FIG. 17 is a sectional view showing the configuration of another height adjustment device of the prior art.
Figure 17:
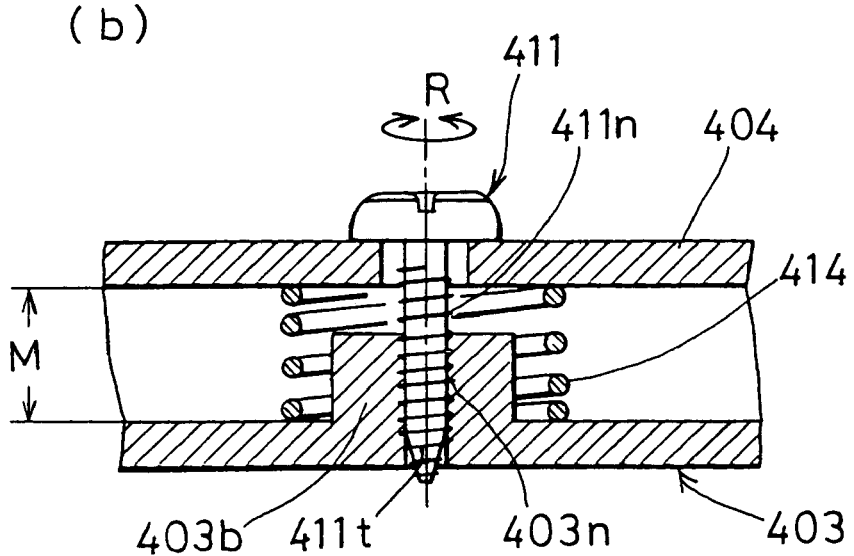

The configuration of Embodiment 3 differs from those of the prior-art adjustment devices described above and shown in FIG. 16 and FIG. 17 in the screw configuration of the adjustment screw 211 and the configuration of the adjustment hole 203a in the sub chassis 203 for receiving the adjustment screw.

As shown in FIG. 13, in the adjustment screw 211 in accordance with Embodiment 3, the diameter of the head portion 211a is formed so as to be larger than the diameter of the through hole 204a in the chassis 204, and the tip portion 211t of the adjustment screw 211 has the shape of a male thread for forming a female thread in the adjustment hole 203a in the sub chassis 203. A threaded portion 211n formed below the head portion 211a of the adjustment screw 211 has a thread having the same pitch as that of the male thread of the tip portion 211t, and its diameter is made slightly smaller than the diameter of the tip portion 211t. As described above, the adjustment screw 211 in accordance with Embodiment 3 comprises the head portion 211a, the threaded portion 211n and the tip portion 211t. The threaded portion 211n is a portion having ordinary thread ridges having the same diameter. The tip portion 211t has a tapping screw for forming a female thread and is formed of at least one thread ridge having a diameter slightly larger than the diameter of the threaded portion 211n. As this kind of screw, ALMITITE (registered trademark) of NITTO SEIKO CO., LTD., devised as a tapping screw to be screwed into a soft material and disclosed in Japanese Unexamined Utility Model Publication No. Hei 8-1340 (Japanese Utility Model Application No. Hei 8-1821), and the like are available.

As shown in FIG. 13, the adjustment hole 203a having a step is formed in the boss portion 203b formed on the sub chassis 203 so as to protrude toward the chassis. In this adjustment hole 203a, a small diameter portion 203s being small in inside diameter is formed on the side into which the adjustment screw 211 is inserted, and a large diameter portion 203d being large in inside diameter is formed on the opposite side. Hence, the adjustment hole 203a is a through hole having the small diameter portion 203s and the large diameter portion 203d, and the step is formed in its internal face.

The small diameter portion 203s of the adjustment hole 203a is formed so as to have a diameter nearly identical to that of the root of the male thread of the adjustment screw 211 so that the female threaded portion 203n is formed as shown in the portion (b) of FIG. 13 when the tip portion 211t of the adjustment screw 211 is screwed therein. In addition, the large diameter portion 203d of the adjustment hole 203a is made larger than the maximum outside diameter portion of the tip portion 211t of the adjustment screw 211.

As shown in the portion (a) of FIG. 13, the distance B from the chassis-side end of the large diameter portion 203d of the adjustment hole 203a to the upper face (the face of the chassis 204 making contact with the head portion 211a of the adjustment screw 211) of the chassis 204 is made shorter than the length A of the threaded portion 211n of the adjustment screw 211. In other words, the length A of the threaded portion 211n of the adjustment screw 211 is made longer than the distance B obtained at the time of height adjustment.

The adjustment operation of the adjustment device 230 in accordance with Embodiment 3 configured as described above will be described by using FIG. 13.

First, the adjustment spring 214 is inserted over the boss portion 203b of the sub chassis 203, and the chassis 204 is disposed at a predetermined position with respect to the sub chassis 203. Next, the adjustment screw 211 including the tip portion 211t having a tapping screw is passed through the through hole 204a in the chassis 204 and screwed into the adjustment hole 203a in the sub chassis 203 (in the direction of arrow F of FIG. 13). At this time, since the tip portion 211t of the adjustment screw 211 has a tapping screw, the tip portion 211t forms a female thread in the small diameter portion 203s of the adjustment hole 203a. Then, the tip portion 211t of the adjustment screw 211 passes through while forming the female thread in the small diameter portion 203s and then reaches the large diameter portion 203d.

Next, in order to adjust the height between the sub chassis 203 and the chassis 204, the adjustment screw 211 is turned (in the directions indicated by arrows R in the position (b) of FIG. 13). Since the threaded portion 211n of the adjustment screw 211 is slightly thinner than the female thread formed by the male thread of the tip portion 211t, smooth engagement is attained between the threaded portion 211n of the adjustment screw 211 and the threaded portion 203n of the boss portion 203b, whereby smooth rotation can be carried out without causing rattling during the above-mentioned adjustment operation.

In Embodiment 3, the length A of the threaded portion 211n of the adjustment screw 211 is configured so as to be made longer than the distance B obtained at the time of the height adjustment as described above. In other words, the length A of the threaded portion 211n is made longer than the sum of the thickness of the chassis 204, the face-to-face distance (including a variation tolerance) from the sub chassis 203 (the main plane thereof) to the chassis 204 and the design distance from the above-mentioned main plane of the sub chassis 203 to the step (the boundary of the small diameter portion 203s and the large diameter portion 203d) of the adjustment hole 203a. For this reason, even if the separation between the sub chassis 203 and the chassis 204 is maximized in consideration of the variation during the adjustment operation, the tip portion 211t of the adjustment screw 211 is disposed in the large diameter portion 203d at all times, thereby not engaging the small diameter portion 203s. As a result, in the adjustment operation in accordance with Embodiment 3, the rotation of the adjustment screw 211 does not become heavy, whereby smooth adjustment work can be carried out at all times.

As described above, the height of the head portion 211a of the adjustment screw 211 is adjusted by the engagement between the threaded portion 211n of the adjustment screw 211 and the threaded portion 203n of the small diameter portion 203s during the adjustment operation. Since the sub chassis 203 and the chassis 204 are biased so as to be separated from each other by the adjustment spring 214, the distance (height) between the sub chassis 203 and the chassis 204 is determined.

After the above-mentioned adjustment work is completed, the adjustment screw 211 is locked by using locking paint or the like to prevent rotation. At this time, by applying the locking paint to the space between the large diameter portion 203d and the tip portion 211t, an adhesion area can be obtained sufficiently, whereby highly reliable adhesion and locking are made possible.

As described above, in Embodiment 3, the adjustment screw 211 is provided with the threaded portion 211n, that is, an ordinary male threaded portion, and the tip portion 211t for forming a female thread, and the length of the small diameter portion 203s of the sub chassis 203 is set at a length obtained from the maximum separation distance obtained during the height adjustment operation. Hence, in the adjustment device in accordance with Embodiment 3, it is not necessary to form a female thread in the adjustment hole in the sub chassis 203 in advance. Furthermore, during the adjustment operation in accordance with Embodiment 3, the tip portion 211t of the adjustment screw 211 does not make contact with the small diameter portion 203s, whereby the rotation of the adjustment screw 211 is smooth and fine-adjustment can be carried out easily.

Embodiment 3 is configured so that the adjustment hole 203a in the sub chassis 203 has the small diameter portion 203s and the large diameter portion 203d; however, the adjustment device in accordance with the present invention is not necessarily limited to this kind of configuration. For example, it may be possible to use a configuration wherein no large diameter portion is formed in the adjustment hole and the tip portion of the adjustment screw protrudes completely from the rear face of the sub chassis or is exposed outside at the time of the adjustment work.

In Embodiment 3, an example wherein the boss portion 203b is formed on the sub chassis 203 so as to protrude toward the chassis is described; however, if the sub chassis has a thickness enough to be able to form a female thread, it is not necessary to provide the boss portion. In addition, even if it is necessary to provide the boss portion on the sub chassis, the boss portion may be provided on the opposite side not facing the chassis.

Furthermore, a portion (a non-threaded portion) with no male thread and having the same diameter as the outside diameter (the diameter of the thread ridges) of the threaded portion 211n may be formed between the head portion 211a and the threaded portion 211n of the adjustment screw 211. In this case, it is necessary to set the length of the non-threaded portion at such a length as the non-threaded portion does not reach the small diameter portion 203s even if there is a variation during the adjustment operation. Generally, the length of this non-threaded portion is set as equal as the thickness of the chassis 204.

As clarified by the detailed descriptions regarding each embodiment, the present invention has the following effects.

In accordance with the present invention, adjustment can be carried out easily and securely so that the movement face of the optical pickup becomes parallel with the recording face of the optical disk, whereby a highly reliable optical disk apparatus can be provided.

In accordance with the present invention, the tilt chassis is provided with the main shaft, the sub shaft and the optical pickup at their desired positions in advance, and the tilt chassis is configured so as to be installed on the traverse chassis and tilt-adjusted. Hence, the number of man-hours for adjustment work is reduced, and special adjustment devices are not required to be provided, whereby secure adjustment work can be carried out easily. As a result, the present invention can provide a highly reliable optical disk apparatus at low production cost.

Furthermore, in accordance with the present invention, the tilt chassis is provided and the opening portion is formed only at the portion along the movement path of the optical pickup, whereby air current produced by the rotation of the optical disk hardly enters the optical pickup body; therefore, dust generated owing to the air current produced by the rotation of the optical disk and adhering to the optical components inside the optical pickup is reduced significantly, whereby the reliability of the apparatus can be raised.

Still further, in accordance with the present invention, by providing the tilt chassis separate from the traverse chassis, it is not necessary to secure extra space for adjustment inside the apparatus, thereby being capable of meeting the need for the profile reduction of the apparatus.

Still further, in the optical disk apparatus in accordance with the present invention, since the elastic body is provided between the traverse chassis and the tilt chassis, vibration from the spindle motor and the like is absorbed, whereby writing and reading operations can be carried out securely.

Still further, in the optical disk apparatus in accordance with the present invention, since the connection portion from the first traverse driving means of the traverse chassis to the second traverse driving means of the tilt chassis is provided in the vicinity of the adjustment support portion for the tilt chassis and the traverse chassis, the connection portion between the first traverse driving means and the second traverse driving means is maintained in a state of being capable of securely transmitting the driving force even when the tilt adjustment work is carried out.

Still further, in the optical disk apparatus in accordance with the present invention, since the tilt chassis that holds the main shaft, the sub shaft and the optical pickup is provided with the optical pickup unit equipped with the tilt chassis cover, the rigidity of the tilt chassis holding various components can be raised, and air current produced by the rotation of the optical disk is prevented from entering the optical components of the optical pickup. As a result, in accordance with the present invention, the tilt adjustment operation can be carried out easily, and the optical components are prevented from being stained, whereby it is possible to provide a highly reliable optical disk apparatus.

Still further, in the optical disk apparatus in accordance with the present invention, since the optical pickup unit is configured so as to be installed on the rear face side of the traverse chassis, it is possible to provide an optical disk apparatus being maintained easily.

Still further, in the height adjustment device in accordance with the present invention, it is not necessary to form a female thread in the adjustment hole in the sub chassis in advance. Moreover, during the adjustment operation, unsmooth adjustment due to heavy rotation of the adjustment screw does not occur, whereby fine-adjustment can be carried out accurately.

Although the present invention has been described with respect to its preferred embodiments in some detail, the disclosed contents of the preferred embodiments may change in the details of the structure thereof, and any changes in the combination and sequence of the components may be attained without departing from the scope and spirit of the claimed invention.

INDUSTRIAL APPLICABILITY

In an optical disk apparatus for reproducing form an optical disk on which information has been recorded and for recording information on an optical disk, tilt adjustment work for adjusting the movement face of an optical pickup so as to be parallel with the recording face of the optical disk is made easy, whereby an optical disk apparatus and a height adjustment device being high in reliability and low in profile are provided.

What is claimed is:

1. An optical disk apparatus comprising:
   a turntable on which an optical disk is mounted;
   a spindle motor for driving said turntable;
   a traverse chassis to which said spindle motor is secured;
   an optical pickup, moving in the radial direction of said optical disk, for reading information written on said optical disk or writing information on said optical disk;
   a tilt chassis provided with a main shaft and a sub shaft, being parallel with each other, for guiding the movement direction of said optical pickup; and
   tilt adjustment means, having an elastic member so as to absorb vibration between said tilt chassis and said traverse chassis, for tilt-adjusting said tilt chassis with respect to said traverse chassis, wherein said tilt adjustment means comprises two tilt adjustment portions, said tilt chassis is engaged with said traverse chassis so as to be contactingly movable at one adjustment support portion, said adjustment support portion is disposed in the vicinity of the end of said main shaft on the inner circumferential side of the optical disk, one of said tilt adjustment portions is disposed in the vicinity of the end of said main shaft on the outer circumferential side of the optical disk, and the other tilt adjustment portion is disposed on the side of said sub shaft.

2. The optical disk apparatus in accordance with claim 1, wherein said tilt chassis is engaged with said traverse chassis so as to be contactingly movable at one adjustment support portion, said tilt adjustment means comprises two tilt adjustment portions, and the tilt adjustment portions are disposed on both sides of the movement path of said lens projection portion on said tilt chassis.

3. The optical disk apparatus in accordance with claim 2, further comprising:
   a first traverse driving means, provided on said traverse chassis, for generating a driving force, and
   a second traverse driving means, provided on said tilt chassis, for transmitting the driving force for moving said optical pickup from said first traverse driving means to said main shaft, wherein
   a connection portion for transmitting the driving force from said first traverse driving means to said second traverse driving means is provided in the vicinity of the adjustment support portion between said tilt chassis and said traverse chassis.

4. The optical disk apparatus in accordance with claim 1, further comprising:
   a first traverse driving means, provided on said traverse chassis, for generating a driving force, and
   a second traverse driving means, provided on said tilt chassis, for transmitting the driving force for moving said optical pickup from said first traverse driving means to said main shaft.

5. The optical disk apparatus in accordance with claim 1, wherein said sub shaft is integrally molded with said tilt chassis.

6. The optical disk apparatus in accordance with claim 1, wherein said main shaft, said sub shaft and said optical pickup are configured so as to be capable of being installed on said tilt chassis in advance.

7. The optical disk apparatus in accordance with claim 1, further comprising a tilt cover disposed so as to cover said optical pickup, said main shaft and said sub shaft provided on said tilt chassis.

8. The optical disk apparatus in accordance with claim 7, wherein said optical pickup comprises a lens projection portion for applying light to the optical disk and a main body for supporting said lens projection portion so as to be movable in the radial direction of the optical disk, wherein said main body is disposed on the optical disk side of the main face of said tilt chassis.

9. The optical disk apparatus in accordance with claim 1, wherein said tilt chassis can be attached to and detached from said tilt adjustment means without changing the tilt adjustment state between said tilt chassis and said traverse chassis.

10. An optical disk apparatus comprising:
- a turntable on which an optical disk is mounted,
- a spindle motor for driving said turntable,
- a traverse chassis to which said spindle motor is secured,
- an optical pickup, moving in the radial direction of said optical disk, for reading information written on said optical disk or writing information on said optical disk,
- a tilt chassis provided with a main shaft and a sub shaft, being parallel with each other, for guiding the movement direction of said optical pickup, and
- a tilt adjustment means, having an elastic member so as to absorb vibration between said tilt chassis and said traverse chassis, for tilt-adjusting said tilt chassis with respect to said traverse chassis, and
- a tilt cover disposed so as to cover said optical pickup, said main shaft and said sub shaft provided on said tilt chassis,
- wherein said optical pickup, said main shaft and said sub shaft are disposed in internal space formed by said tilt chassis and said tilt cover, wherein said tilt chassis and said tilt cover are integrally tilt-adjustable with respect to said traverse chassis by said tilt adjustment means.

* * * * *